(12) United States Patent
Isobe et al.

(10) Patent No.: US 10,378,146 B2
(45) Date of Patent: Aug. 13, 2019

(54) WATER/OIL REPELLENT COMPOSITION, METHOD FOR ITS PRODUCTION, AND ARTICLE

(71) Applicant: AGC Inc., Chiyoda-ku (JP)

(72) Inventors: Akira Isobe, Chiyoda-ku (JP); Minako Shimada, Chiyoda-ku (JP); Yuuichi Oomori, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 151 days.

(21) Appl. No.: 15/620,219

(22) Filed: Jun. 12, 2017

(65) Prior Publication Data

US 2017/0275813 A1    Sep. 28, 2017

Related U.S. Application Data

(63) Continuation of application No. PCT/JP2015/085264, filed on Dec. 16, 2015.

(30) Foreign Application Priority Data

Dec. 17, 2014  (JP) ................. 2014-254937

(51) Int. Cl.
| | | |
|---|---|---|
| *C09D 5/00* | (2006.01) | |
| *C09D 5/16* | (2006.01) | |
| *C09K 3/18* | (2006.01) | |
| *D06M 15/29* | (2006.01) | |
| *C08F 214/06* | (2006.01) | |
| *C08F 214/18* | (2006.01) | |
| *C08F 220/12* | (2006.01) | |
| *C08F 220/18* | (2006.01) | |
| *C08F 220/22* | (2006.01) | |
| *C08F 220/24* | (2006.01) | |
| *C08F 222/18* | (2006.01) | |
| *C09D 127/14* | (2006.01) | |
| *C09D 133/04* | (2006.01) | |
| *C09D 133/16* | (2006.01) | |
| *C09D 133/24* | (2006.01) | |
| *D06M 101/34* | (2006.01) | |
| *D06M 15/248* | (2006.01) | |
| *D06M 15/256* | (2006.01) | |
| *D06M 15/263* | (2006.01) | |
| *D06M 15/277* | (2006.01) | |
| *D06M 15/353* | (2006.01) | |
| *D06M 15/576* | (2006.01) | |

(52) U.S. Cl.
CPC ......... *D06M 15/277* (2013.01); *C08F 214/06* (2013.01); *C08F 214/18* (2013.01); *C08F 220/12* (2013.01); *C08F 220/18* (2013.01); *C08F 220/22* (2013.01); *C08F 220/24* (2013.01); *C08F 222/18* (2013.01); *C09D 5/00* (2013.01); *C09D 5/16* (2013.01); *C09D 127/14* (2013.01); *C09D 133/04* (2013.01); *C09D 133/16* (2013.01); *C09D 133/24* (2013.01); *C09K 3/18* (2013.01); *D06M 15/248* (2013.01); *D06M 15/256* (2013.01); *D06M 15/263* (2013.01); *D06M 15/29* (2013.01); *D06M 15/353* (2013.01); *D06M 15/576* (2013.01); *D06M 2101/34* (2013.01); *D06M 2200/11* (2013.01); *D06M 2200/12* (2013.01)

(58) Field of Classification Search
CPC .... C08F 214/18; C08F 220/22; C08F 222/18; C08F 214/06; C08F 220/24; C08F 220/12; C08F 220/18; D06M 15/576; D06M 15/256; D06M 15/263; D06M 15/277; D06M 15/353; D06M 15/29; D06M 15/248; D06M 2200/12; D06M 2200/11; D06M 2101/34; C09K 3/18; C09D 5/16; C09D 127/14; C09D 133/04; C09D 133/24; C09D 133/16; C09D 5/00
USPC ........................................ 524/444
See application file for complete search history.

(56) References Cited

U.S. PATENT DOCUMENTS

| | | |
|---|---|---|
| 3,814,741 A | 6/1974 | Caporiccio et al. |
| 7,094,829 B2 | 8/2006 | Audenaert et al. |

(Continued)

FOREIGN PATENT DOCUMENTS

| | | |
|---|---|---|
| CN | 102459494 A | 5/2012 |
| CN | 1435434 A | 8/2018 |

(Continued)

OTHER PUBLICATIONS

International Search Report dated Feb. 23, 2016 in PCT/JP2015/085264, filed on Dec. 16, 2015.

*Primary Examiner* — Angela C Scott
(74) *Attorney, Agent, or Firm* — Oblon, McClelland, Maier & Neustadt, L.L.P.

(57) ABSTRACT

To provide a water/oil repellent composition whereby it is possible to obtain an article which is excellent in each of water repellency, oil repellency and heavy rain durability, a method for its production, and an article which is excellent in each of water repellency, oil repellency, heavy rain durability and texture. The water/oil repellent composition comprises a copolymer containing structural units based on a monomer (a), structural units based on a monomer (b) and structural units based on a monomer (c). Here, the monomer (a) is a compound represented by $(Z—Y)_nX$ (wherein Z is a $C_{1-6}$perfluoroalkyl group, etc.; Y is a bivalent organic group, etc.; n is 1 or 2; and X is a polymerizable unsaturated group). The monomer (b) is a (meth)acrylate having no polyfluoroalkyl group and having an alkyl group with at least 12 carbon atoms. The monomer (c) is a monomer having a poly(oxypolyfluoroalkylene) chain.

13 Claims, No Drawings

(56) References Cited

U.S. PATENT DOCUMENTS

| | | |
|---|---|---|
| 2003/0176572 A1 | 9/2003 | Maekawa et al. |
| 2005/0250921 A1 | 11/2005 | Qiu et al. |
| 2009/0302262 A1 | 12/2009 | Gotz et al. |
| 2012/0040189 A1 | 2/2012 | Shirakawa et al. |
| 2012/0097882 A1 | 4/2012 | Otozawa et al. |
| 2015/0166863 A1 | 6/2015 | Kaneko et al. |

FOREIGN PATENT DOCUMENTS

| | | |
|---|---|---|
| EP | 2 141 212 A1 | 1/2010 |
| EP | 2 141 212 A8 | 1/2010 |
| JP | 2007-536393 | 12/2007 |
| JP | 2009-522436 | 6/2009 |
| JP | 2011-21082 | 2/2011 |
| WO | WO 2008/136436 A1 | 11/2008 |
| WO | WO 2009/154126 A1 | 12/2009 |
| WO | WO 2011/001846 A1 | 1/2011 |
| WO | WO 2014/030648 A1 | 2/2014 |

WATER/OIL REPELLENT COMPOSITION, METHOD FOR ITS PRODUCTION, AND ARTICLE

TECHNICAL FIELD

The present invention relates to a water/oil repellent composition, a method for its production and an article treated by using the water/oil repellent composition.

BACKGROUND ART

As a method for imparting water/oil repellency to a surface of an article (such as a fiber product, etc.), a method of treating the article by using a water/oil repellent composition having dispersed in a liquid medium a copolymer having structural units based on a monomer having a polyfluoroalkyl group, is known. The article treated by using the water/oil repellent composition is required to have such a property (heavy-rain durability) that the water/oil repellency is not lowered substantially even when exposed to heavy rainfall conditions.

As a water/oil repellent composition excellent in heavy-rain durability, for example, the following water/oil repellent composition has been proposed.

A water/oil repellent composition containing a copolymer having structural units based on following monomer (1) and structural units based on the following monomer (2), wherein the proportion of the structural units based on the monomer (2) is from 30 to 80 mol % in the total (100 mol %) of the structural units based on the monomer (1) and the structural units based on the monomer (2) (Patent Document 1).

Monomer (1): a (meth)acrylate having a $C_{1-6}$ perfluoroalkyl group, etc.

Monomer (2): a (meth)acrylate having a $C_{20-30}$ alkyl group.

PRIOR ART DOCUMENT

Patent Document

Patent Document 1: WO2008/136436

DISCLOSURE OF INVENTION

Technical Problem

However, there has been a case where the oil repellency of an article treated by using the water/oil repellent composition, is insufficient.

The present invention is to provide a water/oil repellent composition whereby it is possible to obtain an article which is excellent in each of water repellency, oil repellency, heavy-rain durability and texture, a method for its production, and an article which is excellent in each of water repellency, oil repellency, heavy-rain durability and texture.

Solution to Problem

The present invention has the following embodiments.

[1] A water/oil repellent composition comprising a copolymer containing structural units based on the following monomer (a), structural units based on the following monomer (b) and structural units based on the following monomer (c), and a liquid medium:

Monomer (a): a compound represented by the following formula (1):

$$(Z-Y)_nX \quad (1)$$

wherein Z is a $C_{1-6}$ perfluoroalkyl group or a group represented by the following formula (2), Y is a divalent organic group having no fluorine atom, or a single bond, n is 1 or 2, and X is, when n is 1, any one of groups represented by the following formulae (3-1) to (3-5), or, when n is 2, any one of groups represented by the following formulae (4-1) to (4-4):

$$C_sF_{2s+1}CH_2CF_2-(CH_2CF_2)_t(CF_2CF_2)_u- \quad (2)$$

wherein s is an integer of from 1 to 6, t is an integer of from 0 to 3, and u is an integer of from 1 to 3, $$-CR=CH_2 \quad (3\text{-}1),$$

$$-C(O)OCR=CH_2 \quad (3\text{-}2),$$

$$-OC(O)CR=CH_2 \quad (3\text{-}3),$$

$$-OCH_2\text{-}\varphi\text{-}CR=CH_2 \quad (3\text{-}4),$$

$$-OCH=CH_2 \quad (3\text{-}5),$$

wherein R is a hydrogen atom, a methyl group or a halogen atom, and $\varphi$ is a phenylene group, $$-CH[-(CH_2)_mCR=CH_2]- \quad (4\text{-}1),$$

$$-CH[-(CH_2)_mC(O)OCR=CH_2]- \quad (4\text{-}2),$$

$$-CH[-(CH_2)_mOC(O)CR=CH_2]- \quad (4\text{-}3),$$

$$-OC(O)CH=CHC(O)O- \quad (4\text{-}4).$$

wherein R is a hydrogen atom, a methyl group or a halogen atom, and m is an integer of from 0 to 4, Monomer (b): a (meth)acrylate having no polyfluoroalkyl group and having an alkyl group with at least 12 carbon atoms, Monomer (c): a monomer having a poly(oxypolyfluoroalkylene) chain wherein the proportion of the number of fluorine atoms to the total number of fluorine atoms and hydrogen atoms is at least 70%.

[2] The water/oil repellent composition according to [1], wherein the proportion of structural units based on the monomer (a) in the copolymer is from 5 to 40 mass % among the structural units (100 mass %) based on all monomers constituting the copolymer, the proportion of structural units based on the monomer (b) in the copolymer is from 40 to 94.9 mass % among the structural units (100 mass %) based on all monomers constituting the copolymer, and the proportion of structural units based on the monomer (c) in the copolymer is from 0.1 to 20 mass % among the structural units (100 mass %) based on all monomers constituting the copolymer.

[3] The water/oil repellent composition according to [1] or [2], wherein the copolymer further contains structural units based on following monomer (d):

Monomer (d): a halogenated olefin.

[4] The water/oil repellent composition according to [3], wherein the proportion of structural units based on the monomer (d) in the copolymer is at most 30 mass % among the structural units (100 mass %) based on all monomers constituting the copolymer.

[5] The water/oil repellent composition according to any one of [1] to [4], wherein the copolymer further contains structural units based on following monomer (e):

Monomer (e): a monomer having a crosslinkable functional group.

[6] The water/oil repellent composition according to [5], wherein the proportion of structural units based on the monomer (e) in the copolymer is at most 20 mass % among the structural units (100 mass %) based on all monomers constituting the copolymer.

[7] The water/oil repellent composition according to any one of [1] to [6], wherein the copolymer further contains structural units based on following monomer (f):

Monomer (f): a monomer containing no fluorine atom, other than the above monomer (b), halogenated olefin and monomer having a crosslinkable functional group.

[8] The water/oil repellent composition according to [7], wherein the proportion of structural units based on the monomer (f) in the copolymer is at most 35 mass % among the structural units (100 mass %) based on all monomers constituting the copolymer.

[9] The water/oil repellent composition according to any one of [1] to [8], wherein the water/oil repellent composition further contains a surfactant, the liquid medium is an aqueous liquid medium, and the copolymer is emulsified in the aqueous liquid medium.

[10] A method for producing a water/oil repellent composition, which comprises polymerizing monomer components comprising the following monomer (a), the following monomer (b) and the following monomer (c) in a liquid medium in the presence of a surfactant and a polymerization initiator, to form a copolymer:

Monomer (a): a compound represented by the following formula (1):

$$(Z-Y)_nX \qquad (1)$$

wherein Z is a $C_{1-6}$ perfluoroalkyl group or a group represented by the following formula (2), Y is a divalent organic group having no fluorine atom, or a single bond, n is 1 or 2, and X is, when n is 1, any one of groups represented by the following formulae (3-1) to (3-5), or, when n is 2, any one of groups represented by the following formulae (4-1) to (4-4):

$$C_sF_{2s+1}CH_2CF_2-(CH_2CF_2)_t(CF_2CF_2)_u- \qquad (2)$$

wherein s is an integer of from 1 to 6, t is an integer of from 0 to 3, and u is an integer of from 1 to 3,

—CR=CH$_2$ (3-1),

—C(O)OCR=CH$_2$ (3-2),

—OC(O)CR=CH$_2$ (3-3),

—OCH$_2$—φ—CR=CH$_2$ (3-4),

—OCH=CH$_2$ (3-5), wherein R is a hydrogen atom, a methyl group or a halogen atom, and φ is a phenylene group, —CH[—(CH$_2$)$_m$CR=CH$_2$]— (4-1), —CH[—(CH$_2$)$_m$C(O)OCR=CH$_2$]— (4-2), —CH[—(CH$_2$)$_m$OC(O)CR=CH$_2$]— (4-3),

—OC(O)CH=CHC(O)O— (4-4).

wherein R is a hydrogen atom, a methyl group or a halogen atom, and m is an integer of from 0 to 4, Monomer (b): a (meth)acrylate having no polyfluoroalkyl group and having an alkyl group with at least 12 carbon atoms, Monomer (c): a monomer having a poly(oxypolyfluoroalkylene) chain wherein the proportion of the number of fluorine atoms to the total number of fluorine atoms and hydrogen atoms is at least 70%.

[11] The method for producing a water/oil repellent composition according to [10], wherein the proportion of the monomer (a) in the monomer components is from 5 to 40 mass % among the monomer components (100 mass %), the proportion of the monomer (b) in the monomer components is from 40 to 94.9 mass % among the monomer components (100 mass %), and the proportion of the monomer (c) in the monomer components is from 0.1 to 20 mass % among the monomer components (100 mass %).

[12] The method for producing a water/oil repellent composition according to [10] or [11], wherein the monomer components further contain the following monomer (d):

Monomer (d): a halogenated olefin.

[13] The method for producing a water/oil repellent composition according to any one of [10] to [12], wherein the monomer components further contain the following monomer (e):

Monomer (e): a monomer having a crosslinkable functional group.

[14] An article treated by using the water/oil repellent composition as defined in any one of [1] to [9].

[15] The article according to [14], wherein the article is a fiber product.

Advantageous Effects of Invention

According to the water/oil repellent composition of the present invention, it is possible to obtain an article which is excellent in each of water repellency, oil repellency, heavy-rain durability and texture.

According to the method for producing a water/oil repellent composition of the present invention, it is possible to obtain a water/oil repellent composition whereby it is possible to obtain an article which is excellent in each of water repellency, oil repellency, heavy-rain durability and texture.

The article of the present invention is excellent in each of water repellency, oil repellency, heavy-rain durability and texture.

DESCRIPTION OF EMBODIMENTS

In the present specification, a compound represented by formula (1) will be referred to as a compound (1). Compounds represented by other formulae will be referred to in the same manner.

In the present specification, a group represented by the formula (2) will be referred to as a group (2). Groups represented by other formulae will be referred to in the same manner.

The following definitions of terms apply throughout the present specification including claims.

A "(meth)acrylate" is a generic term for an acrylate and a methacrylate.

A "monomer" means a compound having a polymerizable unsaturated group.

A "polyfluoroalkyl group" means a group having some or all of hydrogen atoms of an alkyl group substituted by fluorine atoms. Hereinafter, a "polyfluoroalkyl group" may be referred to also as a "$R^f$ group".

A "perfluoroalkyl group" means a group having all of hydrogen atoms of an alkyl group substituted by fluorine atoms. Hereinafter, a "perfluoroalkyl group" may be referred to also as a "$R^F$ group".

An "oxypolyfluoroalkylene group" means a group having some or all of hydrogen atoms of an oxyalkylene group substituted by fluorine atoms.

An "oxyperfluoroalkylene group" means a group having all of hydrogen atoms of an oxyalkylene group substituted by fluorine atoms.

A "number average molecular weight" and a "mass average molecular weight" of a copolymer are values obtained as calculated as polystyrene by a gel permeation chromatography (GPC) method.

A "number average molecular weight" of a poly(oxypolyfluoroalkylene) chain in the monomer (c) is a value of a molecular weight obtained by calculating the number of each oxypolyfluoroalkylene unit based on $CF_2CH_2OH$ by $^{19}$F-NMR.

<Water/Oil Repellent Composition>

The water/oil repellent composition of the present invention contains a specific copolymer as an essential component, and, as the case requires, contains a liquid medium, a surfactant, an additive, etc.

(Copolymer)

The copolymer contains structural units based on a monomer (a) (hereinafter referred to also as "(a) units"), structural units based on a monomer (b) (hereinafter referred to also as "(b) units") and structural units based on a monomer (c) (hereinafter referred to also as "(c) units").

The copolymer preferably further contains structural units based on a monomer (d) (hereinafter referred to also as "(d) units") and/or structural units based on a monomer (e) (hereinafter referred to also as "(e) units").

The copolymer may have, as the case requires, structural units based on a monomer (f) (hereinafter referred to also as "(f) units").

Monomer (a):

The monomer (a) is a compound (1).

$$(Z-Y)_nX \quad (1).$$

Z is a $C_{1-6}R^F$ group or a group represented by the following formula (2).

$$C_sF_{2s+1}CH_2CF_2-(CH_2CF_2)_t(CF_2CF_2)_u- \quad (2)$$

Here, s is an integer of from 1 to 6, t is an integer of from 0 to 3, and u is an integer of from 1 to 3.

The number of carbon atoms in the $R^F$ group is preferably from 4 to 6. The $R_F$ group may be linear or branched, but is preferably linear. Arrangement of $(CH_2CF_2)_t(CF_2CF_2)_u$ may be random or block.

As Z, the following groups may be mentioned.
$F(CF_2)_4-$,
$F(CF_2)_5-$,
$F(CF_2)_6-$,
$(CF_3)_2CF(CF_2)_2-$, etc.

Y is a divalent organic group having no fluorine atom, or a single bond.

The divalent organic group is a divalent group containing carbon atom(s). However, if the terminal atom of X bonded to the divalent organic group is an etheric oxygen atom, the terminal atom of the divalent organic group bonded to X is a carbon atom.

As the divalent organic group, preferred are an alkylene group, an alkenylene group, and an alkylene group having —O—, —NH—, —CO—, —SO$_2$— or —S— at its terminal or between carbon-carbon atoms. These groups may be linear or branched, but are preferably linear.

As Y, the following groups may be mentioned.
—CH$_2$—,
—CH$_2$CH$_2$—,
—(CH$_2$)$_3$—,
—CH$_2$CH$_2$CH(CH$_3$)—,
—CH=CH—CH$_2$—,
—S—CH$_2$CH$_2$—,
—SO$_2$—CH$_2$CH$_2$—,
—CH$_2$CH$_2$CH$_2$—S—CH$_2$CH$_2$—,
—CH$_2$CH$_2$CH$_2$—SO$_2$—CH$_2$CH$_2$—, etc.

n is 1 or 2.

X is, when n is 1, any one of groups (3-1) to (3-5), or, when n is 2, any one of groups (4-1) to (4-4).

$$-CR=CH_2 \quad (3-1),$$

$$-C(O)OCR=CH_2 \quad (3-2),$$

$$-OC(O)CR=CH_2 \quad (3-3),$$

$$-OCH_2\text{-}\varphi\text{-}CR=CH_2 \quad (3-4),$$

$$-OCH=CH_2 \quad (3-5),$$

Here, R is a hydrogen atom, a methyl group or a halogen atom, and φ is a phenylene group. As R, a hydrogen atom, a methyl group or a chlorine atom is preferred.

$$-CH[-(CH_2)_mCR=CH_2]- \quad (4-1),$$

$$-CH[-(CH_2)_mC(O)OCR=CH_2]- \quad (4-2),$$

$$-CH[-(CH_2)_mOC(O)CR=CH_2]- \quad (4-3),$$

$$-OC(O)CH=CHC(O)O- \quad (4-4).$$

Here, R is a hydrogen atom, a methyl group or a halogen atom, and m is an integer of from 0 to 4. As R, a hydrogen atom, a methyl group or a chlorine atom is preferred.

As the compound (1), from the viewpoint of polymerizability with other monomers, flexibility of a coating film of the copolymer, adhesion of the copolymer to an article, dispersibility or solubility in the liquid medium, easiness of emulsion polymerization, etc., preferred are an acrylate, a methacrylate and an acrylate having its α-position substituted by a halogen atom, which have a $C_{1-6}R^F$ group, and the number of carbon atoms in the $R^F$ group is more preferably from 4 to 6.

As the compound (1), particularly preferred is a compound wherein Z is a $C_{4-6}R^F$ group, Y is a $C_{1-4}$ alkylene group, n is 1, X is a group (3-3), and R is a hydrogen atom, a methyl group or a chlorine atom.

As the compound (1), compounds represented by the following formula (I) are preferred.

$$C_pF_{2p+1}C_qH_{2q}OCOCR=CH_2 \quad (I)$$

Here, p is an integer of from 1 to 6, q is an integer of from 1 to 4, and R is a hydrogen atom, a methyl group or a halogen atom. As R, a hydrogen atom, a methyl group or a chlorine atom is preferred.

Among the compounds represented by the formula (I), the following ones may be mentioned as preferred specific examples.

$C_6F_{13}C_2H_4OCOC(CH_3)=CH_2$,
$C_6F_{13}C_2H_4OCOCH=CH_2$,
$C_6F_{13}C_2H_4OCOCCl=CH_2$,
$C_4F_9C_2H_4OCOC(CH_3)=CH_2$,
$C_4F_9C_2H_4OCOCH=CH_2$,
$C_4F_9C_2H_4OCOCCl=CH_2$.

Monomer (b):

The monomer (b) is a (meth)acrylate having no $R^f$ group and having an alkyl group with at least 12 carbon atoms. The number of carbon atoms in the alkyl group is preferably from 18 to 30, more preferably from 20 to 24.

When the number of carbon atoms in the alkyl group is at least the above lower limit value, heavy-rain durability of an article treated by using the water/oil repellent composition will be good. When the number of carbon atoms in the alkyl group is at most the above upper limit value, handling in polymerization operation will be easy, and it will be possible to obtain the copolymer in good yield.

As the monomer (b), stearyl (meth)acrylate or behenyl (meth)acrylate is preferred, behenyl (meth)acrylate is more preferred, and behenyl acrylate is further preferred.

Monomer (c):

The monomer (c) is a monomer having a poly(oxypolyfluoroalkylene) chain wherein the proportion of the number of fluorine atoms to the total number of fluorine atoms and hydrogen atoms is at least 70%.

The poly(oxypolyfluoroalkylene) chain may be a polymer chain composed of units consisting of at least one oxypolyfluoroalkylene group, or a polymer chain composed of units consisting of at least one oxypolyfluoroalkylene group and units consisting of at least one oxyalkylene group. Preferably, it does not contain units consisting of an oxyalkylene group.

The poly(oxypolyfluoroalkylene) chain is preferably a poly(oxyperfluoroalkylene) chain composed of units made of at least one oxyperfluoroalkylene group, or a polymer chain composed of units made of at least one oxyperfluoroalkylene group and units made of at least one oxypolyfluoroalkylene group containing hydrogen atom(s).

The proportion of the number of fluorine atoms to the total number of fluorine atoms and hydrogen atoms in the poly (oxypolyfluoroalkylene) chain is preferably at least 75%, more preferably from 90 to 100%. A particularly preferred poly(oxypolyfluoroalkylene) chain is a poly(oxyperfluoroalkylene) chain consisting of at least one oxyperfluoroalkylene group.

As the copolymer has (c) units, it can sufficiently exhibit both the heavy-rain durability derived from (a) units and the oil repellency derived from (b) units.

As the monomer (c), a compound (5) is preferred.

$$(X^1\text{—})_a Y^1\text{—}Z^1\text{—}Y^2(\text{—}X^2)_b \quad (5).$$

Here, $X^1$ is a hydrogen atom, a fluorine atom, a hydroxy group or $CH_2$=$CR^1C(O)O$—, and $X^2$ is —$OC(O)CR^1$=$CH_2$ (wherein $R^1$ is a hydrogen atom, a methyl group or a halogen atom).

$Y^1$ is a (a+1) valent organic group or a single bond, and $Y^2$ is a (b+1) valent organic group.

$Z^1$ is a poly(oxypolyfluoroalkylene) chain.

a is an integer of 1 or more, and b is an integer of 1 or more.

a is preferably an integer of from 1 to 4, more preferably an integer of 1 or 2.

b is preferably an integer of from 1 to 4, more preferably an integer of 1 or 2.

The number of —$OC(O)CR^1$=$CH_2$ in the compound (5) is preferably from 1 to 4, more preferably 1 or 2.

The poly(oxypolyfluoroalkylene) chain represented by $Z^1$ is preferably made of a polymer chain in which $C_{1-6}$ oxypolyfluoroalkylene units of at least one type are linked. The poly(oxypolyfluoroalkylene) chain may consist of oxypolyfluoroalkylene units of one type, or it may be a combination of oxypolyfluoroalkylene units of two or more types. The bonding order of units of two or more types is not limited.

The polyfluoroalkylene unit may, for example, be an oxyperfluoroalkylene unit such as a ($CF_2O$) unit, a ($CF_2CF_2O$) unit, a ($CF_2CF_2CF_2O$) unit, a ($CF(CF_3)CF_2O$) unit, a ($CF_2CF_2CF_2CF_2O$) unit, etc., and an oxypolyfluoroalkylene unit having hydrogen atom(s) such as ($CF_2CF_2CF_2CH_2O$) unit, a ($CF_2CF_2CF_2CF_2CH_2O$) unit, a ($CF_2CHFO$) unit, etc. The oxypolyfluoroalkylene unit having hydrogen atom(s) is preferably an oxypolyfluoroalkylene unit wherein the number of hydrogen atoms is from 1 to 4 (provided that the proportion of the number of hydrogen atoms to the total number of fluorine atoms and hydrogen atoms is at most 50%).

The poly(oxypolyfluoroalkylene) chain is preferably a polymer chain composed of oxyperfluoroalkylene units, or a polymer chain composed of perfluoroalkylene units and oxypolyfluoroalkylene units having hydrogen atom(s), particularly preferably a poly(oxy perfluoroalkylene) chain.

The number average molecular weight of the poly(oxypolyfluoroalkylene) chain is preferably from 100 to 20,000, more preferably from 500 to 15,000, further preferably from 500 to 10,000.

In a case where the poly(oxypolyfluoroalkylene) chain has oxypolyfluoroalkylene units of two or more types, their bonding order is not limited. For example, in a case where it has ($CF_2CF_2O$) units and ($CF_2CF_2CF_2O$) units, the ($CF_2CF_2O$) units and ($CF_2CF_2CF_2O$) units may be arranged randomly, or the ($CF_2CF_2O$) units and ($CF_2CF_2CF_2O$) units may be arranged alternately, or at least one block composed of a plurality of ($CF_2CF_2O$) units and at least one block composed of a plurality of ($CF_2CF_2CF_2O$) units may be linked. Further, in a case where it has ($CF_2O$) units and other oxyperfluoroalkylene units, the ($CF_2O$) units are usually randomly arranged.

As Z1, the following groups may be mentioned. Here, among the following, with respect to one having oxypolyfluoroalkylene units of two types, the description of its chemical formula is not intended to mean that such units are arranged in blocks, but as mentioned above, their bonding sequence is not limited.

—($CF_2O$)$_f$—($CF_2CF_2O$)$_g$—,
—($CF_2O$)$_f$—($CF(CF_3)CF_2O$)$_i$—,
—($CF_2CF_2O$)$_g$—,
—($CF_2CF_2CF_2O$)$_h$—,
—($CF(CF_3)CF_2O$)$_i$—,
—($CF_2CF_2CF_2CF_2O$)$_j$—
—($CF_2CF_2CF_2CH_2O$)$_k$—
—($CF_2CF_2O$)$_g$—($CF_2CF_2CF_2CF_2O$)$_j$—
—($CF_2CHFO$)$_q$—($CF_2CF_2CF_2CH_2O$)$_k$—, etc.

The above f to q are the following integers whereby the number-average molecular weight of the poly(oxypolyfluoroalkylene) chain will be within the above-mentioned range.

f is an integer of from 1 to 100, preferably an integer of from 1 to 80, more preferably an integer of from 1 to 50.

g is an integer of from 1 to 200, preferably an integer of from 1 to 150, more preferably an integer of from 1 to 100.

h is an integer of from 1 to 200, preferably an integer of from 1 to 150, more preferably an integer of from 1 to 100.

i is an integer of from 1 to 200, preferably an integer of from 1 to 150, more preferably an integer of from 1 to 100.

j is an integer of from 1 to 200, preferably an integer of from 1 to 150, more preferably an integer of from 1 to 100.

k is an integer of from 1 to 200, preferably an integer of from 1 to 150, more preferably an integer of from 1 to 100.

q is an integer of from 1 to 100, preferably an integer of from 1 to 80, more preferably an integer of from 1 to 50.

As $Z^1$, the following groups are preferred.

—$(CF_2O)_{f1}$—$(CF_2CF_2O)_{g1}$-[g1/f1=about 1 molar ratio, number-average molecular weight: 500 to 4,000, f1 ($CF_2O$) groups and g1 ($CF_2CF_2O$) groups are randomly arranged], —$(CF_2O)_{f2}$—$(CF(CF_3)CF_2O)_{i1}$-[i1/f2=1.5 to 2.5, number average molecular weight: 1,500 to 1,800, f2 ($CF_2O$) groups and i1 ($CF(CF_3)CF_2O$) groups are randomly arranged], —$(CF_2CF_2CF_2O)_{h1}$—,
—$(CF(CF_3)CF_2O)_{i2}$—,
—$(CF_2CF_2O)_{g2}$—.

Here, f1 is an integer of from 1 to 60, f2 is an integer of from 1 to 30, g1 is an integer of from 1 to 35, g2 is an integer of from 1 to 15, h1 is an integer of from 15 to 50, i1 is an integer of from 1 to 50, and i2 is an integer of from 15 to 50.

A compound having a poly(oxyperfluoroalkylene) chain wherein $Z^1$ is the above —$(CF_2O)_{f1}$—$(CF_2CF_2O)^{g1}$—, —$(CF_2O)_{f2}$—$(CF(CF_3)CF_2O)_{i1}$—, etc., is commercially available, and the compound (5) is preferably such a commercially available compound, or a compound derived from such a commercially available compound.

As the commercially available compound, for example, the following compounds may be mentioned. Here, the following d represents an integer of from 1 to 30.

$HCF_2O$—$Z^1$—$CF_2H$,
$HOCH_2CF_2O$—$Z^1$—$CF_2CH_2OH$
$HO(CH_2CH_2O)_dCH_2CF_2O$—$Z^1$—$CF_2CH_2(OCH_2CH_2)_dOH$,
$HOCH_2CH(OH)CH_2OCH_2CF_2O$—$Z^1$—$CF_2CH_2OCH_2CH(OH)CH_2OH$,
$HOCH_2CH(OH)OCH_2CF_2O$—$Z^1$—$CF_2CH_2OCH(OH)CH_2OH$,
$HOOC(CH_2CH_2O)_dCH_2CF_2O$—$Z^1$—$CF_2CH_2(OCH_2CH_2)_dCOOH$.

The compound (5) is preferably the above diol or tetraol derivative, more preferably the above diol derivative.

When $Y^1$ is a divalent organic group, the following groups may be mentioned. However, in a case where $Y^1$ wherein —O— is present at its terminal is adopted, the bonding terminal of $X^1$ or $Z^1$ which is bonded to —O— of $Y^1$ would not be —O—. The same applies to each group of a compound represented by another formula. Further, the following Q is a divalent group obtained by removing the isocyanate groups of a diisocyanate represented by OCN-Q-NCO.

—$CF_2O$—
—$(CH_2)_c(CF_2)_cO$—,
—$(CH_2CH_2O)_dCH_2CF_2O$—,
—$CH_2CH(OH)CH_2OCH_2CF_2O$—,
—$(CH_2)_c$—$NHC(O)O$—$Y^{11}$—,
—$(CH_2)_c$—$OC(O)NH$-Q-$NHC(O)O$—$Y^{11}$—, etc.

Here, c each independently is an integer of from 1 to 10, and $Y^{11}$ is —$(CH_2)_cCF_2O$—, —$(CH_2CH_2O)_dCH_2CF_2O$—, —$CH_2CH(OH)CH_2OCH_2CF_2O$— or —$CH_2CH(OH)OCH_2CF_2O$—. When 2 or more c are present in the same group, the values of c may be the same or different.

As the diisocyanate represented by OCN-Q-NCO, an aromatic diisocyanate, an aliphatic diisocyanate, an alicyclic diisocyanate, etc. may be mentioned. The diisocyanate may, for example, be tolylene diisocyanate, diphenylmethane diisocyanate, xylylene diisocyanate, hexamethylene diisocyanate, dicyclohexylmethane diisocyanate, isophorone diisocyanate, norbornene diisocyanate, etc.

When $Y^1$ is a trivalent or higher valent organic group, for example, those wherein $Y^{11}$ is a —$CH_2CH(OH)CH_2OCH_2CF_2O$—, and the hydroxy group is one further reacted with a carboxy group or an isocyanate group, etc. may be mentioned. Further, there is one wherein in place of the above-mentioned diisocyanate, a polyisocyanate having at least three isocyanate groups is used and reacted. The polyisocyanate having at least three isocyanate groups may, for example, be a nurate-modified product or biuret-modified product of the above-mentioned diisocyanate. The trivalent $Y^1$ may, specifically, be, for example, groups represented by the following formulae (8-1) to (8-4).

In the formulae (8-1) to (8-4), $Y^{12}$ is —$(CH_2)_cCF_2O$—, or —$(CH_2CH_2O)_dCH_2CF_2O$—, and Q, c and d are as described above.

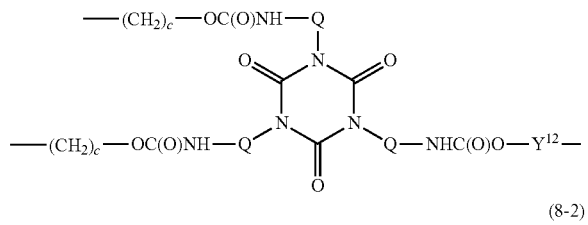
(8-1)

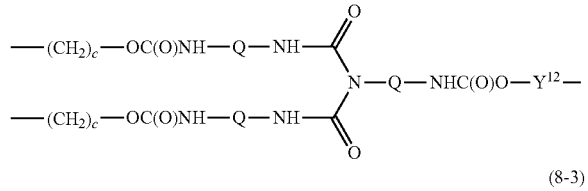
(8-2)

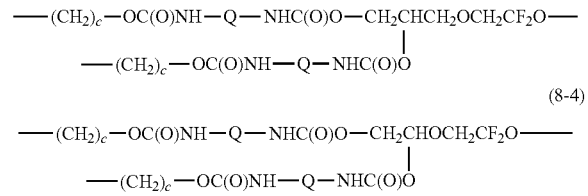
(8-3)

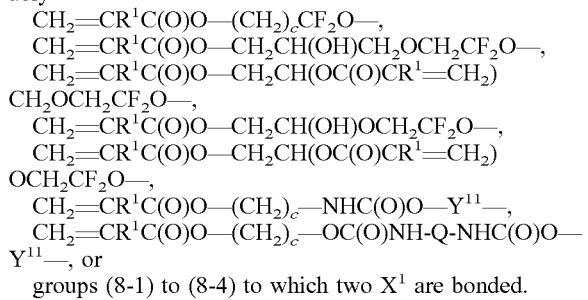
(8-4)

When $X^1$ is a hydrogen atom or a fluorine atom, $Y^1$ is preferably a single bond or —$CF_2O$—.

When $X^1$ is $CH_2$=$CR^1C(O)O$—, $(X^1$—$)_aY^1$— is preferably $CH_2$=$CR^1C(O)O$—$(CH_2)_cCF_2O$—,
$CH_2$=$CR^1C(O)O$—$CH_2CH(OH)CH_2OCH_2CF_2O$—,
$CH_2$=$CR^1C(O)O$—$CH_2CH(OC(O)CR^1$=$CH_2)CH_2OCH_2CF_2O$—,
$CH_2$=$CR^1C(O)O$—$CH_2CH(OH)OCH_2CF_2O$—,
$CH_2$=$CR^1C(O)O$—$CH_2CH(OC(O)CR^1$=$CH_2)OCH_2CF_2O$—,
$CH_2$=$CR^1C(O)O$—$(CH_2)_c$—$NHC(O)O$—$Y^{11}$—,
$CH_2$=$CR^1C(O)O$—$(CH_2)_c$—$OC(O)NH$-Q-$NHC(O)O$—$Y^{11}$—, or groups (8-1) to (8-4) to which two $X^1$ are bonded.

As $(X^1$—$)_aY^1$—, particularly preferred are $CH_2$=$CR^1C(O)O$—$(CH_2)_cCF_2O$—, $CH_2$=$CR^1C(O)O$—$(CH_2)_c$—$OC(O)NH$-Q-$NHC(O)O$—$Y^{11}$— (one wherein Q is a residual group of hexamethylene diisocyanate or a residual group of diphenylmethane diisocyanate), and groups (8-1) to (8-4) to which two $CH_2$=$CR^1C(O)O$— are bonded.

When $Y^2$ is a divalent organic group, as such $Y^2$, the following groups may be mentioned.

—$CF_2$—,
—$(CF_2)_c(CH_2)_c$—,
—$CF_2CH_2(OCH_2CH_2)_d$—,

—CF(CF$_3$)CH$_2$—,
—CF$_2$CH$_2$OCH$_2$CH(OH)CH$_2$—,
—Y$^{21}$—OC(O)NH—(CH$_2$)$_c$—,
—Y$^{21}$—OC(O)NH-Q-NHC(O)O—(CH$_2$)$_c$—, etc.

Here, c, d- and Q are as defined above, and Y$^{21}$ is —CF$_2$(CH$_2$)$_c$—, —CF$_2$CH$_2$(OCH$_2$CH$_2$)$_d$—, —CF$_2$CH$_2$OCH$_2$CH(OH)CH$_2$— or —CF$_2$CH$_2$OCH(OH)CH$_2$—.

When Y$^2$ is a trivalent or higher valent organic group, for example, one wherein Y$^{21}$ is —CF$_2$CH$_2$OCH$_2$CH(OH)CH$_2$—, and the hydroxy group is one further reacted with a carboxy group or an isocyanate group, may be mentioned. Further, there is one wherein in place of the above-mentioned diisocyanate, a polyisocyanate having at least three isocyanate groups is used and reacted. The polyisocyanate having at least three isocyanate groups may, for example, be a nurate-modified product or biuret-modified product of the above-mentioned diisocyanate, etc. The trivalent Y$^2$ may, specifically, be, for example, groups represented by the following formulae (9-1) to (9-4).

In the following formulae (9-1) to (9-4), Y$^{22}$ is —CF$_2$(CH$_2$)$_c$— or —CF$_2$CH$_2$(OCH$_2$CH$_2$)$_d$—, and Q, c and d are as defined above.

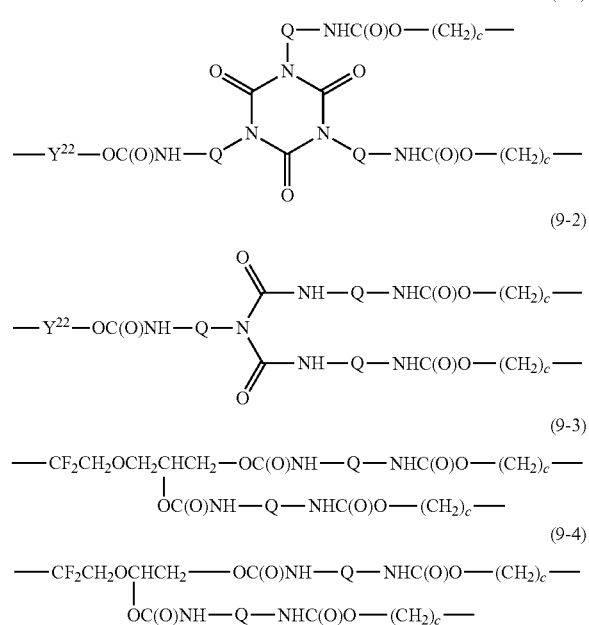

Y$^2$(—X$^2$)$_b$ is preferably
—CF$_2$(CH$_2$)$_c$—OC(O)CR$^1$=CH$_2$,
—CF$_2$CH$_2$OCH$_2$CH(OH)CH$_2$—OC(O)CR$^1$=CH$_2$,
—CF$_2$CH$_2$OCH$_2$CH(OC(O)CR$^1$=CH$_2$)CH$_2$—OC(O)CR$^1$=CH$_2$,
—CF$_2$CH$_2$OCH(OH)CH$_2$—OC(O)CR$^1$=CH$_2$,
—CF$_2$CH$_2$OCH(OC(O)CR$^1$=CH$_2$)CH$_2$—OC(O)CR$^1$=CH$_2$,
—Y$^{21}$—OC(O)NH—(CH$_2$)$_c$—OC(O)CR$^1$=CH$_2$,
—Y$^{21}$—OC(O)NH-Q-NHC(O)O—(CH$_2$)$_c$—OC(O)CR$^1$=CH$_2$, or
groups (9-1) to (9-4) to which two —OC(O)CR$^1$=CH$_2$ are bonded.

As —Y$^2$(—X$^2$)$_b$, particularly preferred are —CF$_2$(CH$_2$)$_c$—OC(O)CR$^1$=CH$_2$, —Y$^{21}$—OC(O) NH—(CH$_2$)$_c$—OC(O)CR$^1$=CH$_2$, —Y$^{21}$—OC(O)NH-Q-NHC(O)O—(CH$_2$)$_c$— (one wherein Q is a residual group of hexamethylene diisocyanate or diphenylmethane diisocyanate), and groups (9-1) to (9-4) to which two —OC(O)CR$^1$=CH$_2$ are bonded.

As the compound (5), the following compounds may be mentioned.

CH$_2$=CR$^1$C(O)O—CH$_2$CF$_2$O—[(CF$_2$O)$_f$—(CF$_2$CF$_2$O)$_g$]—CF$_2$CH$_2$—OC(O)CR$^1$=CH$_2$,
CH$_2$=CR$^1$C(O)O—CH$_2$CF$_2$O—[(CF$_2$O)$_f$—(CF(CF$_3$)CF$_2$O)$_i$]—CF$_2$CH$_2$—OC(O)CR$^1$=CH$_2$,
CH$_2$=CR$^1$C(O)O—CH$_2$CF$_2$O—(CF$_2$CF$_2$CF$_2$O)$_h$—CF$_2$CH$_2$—OC(O)CR$^1$=CH$_2$,
CH$_2$=CR$^1$C(O)O—CH$_2$CF$_2$O—(CF(CF$_3$)CF$_2$O)$_i$—CF$_2$CH$_2$—OC(O)CR$^1$=CH$_2$,
CH$_2$=CR$^1$C(O)O—CH$_2$CF$_2$O—(CF$_2$CF$_2$O)$_g$—CF$_2$CH$_2$—OC(O)CR$^1$=CH$_2$,
CH$_2$=CR$^1$C(O)O—CH$_2$CF$_2$O—[(CF$_2$CHFO)$_q$—(CF$_2$CF$_2$CF$_2$CH$_2$O)$_k$]—OC(O)CR$^1$=CH$_2$,
CH$_2$=CR$^1$C(O)O—CH$_2$CF$_2$CF$_2$CF$_2$O—[(CF$_2$CF$_2$O)$_g$—(CF$_2$CF$_2$CF$_2$CF$_2$O)$_j$]—CF$_2$CF$_2$CF$_2$CH$_2$—OC(O)CR$^1$=CH$_2$,
G-CH$_2$CF$_2$O—[(CF$_2$O)$_f$—(CF$_2$CF$_2$O)$_g$]—CF$_2$CH$_2$-G,
G-CH$_2$CF$_2$O—[(CF$_2$O)$_f$—(CF(CF$_3$)CF$_2$O)$_i$]—CF$_2$CH$_2$-G,
G-CH$_2$CF$_2$CF$_2$O—(CF$_2$CF$_2$CF$_2$O)$_h$—CF$_2$CF$_2$CH$_2$-G,
G-CH$_2$CF$_2$O—(CF(CF$_3$)CF$_2$O)$_i$—CF$_2$CH$_2$-G,
G-CH$_2$CF$_2$O—(CF$_2$CF$_2$O)$_g$—CF$_2$CH$_2$-G,
G-CH$_2$CF$_2$CF$_2$O—[(CF$_2$CF$_2$O)$_g$—CF$_2$CF$_2$CF$_2$CH$_2$O)$_j$]—CF$_2$CF$_2$CH$_2$-G,
G-CH$_2$CF$_2$O—[(CF$_2$CF$_2$O)$_g$—(CF$_2$CF$_2$CF$_2$CF$_2$O)$_j$]—CF$_2$CH$_2$-G,
F—[(CF$_2$O)$_f$—(CF$_2$CF$_2$O)$_g$]—CF$_2$CH$_2$—OC(O)CR$^1$=CH$_2$,
F—[(CF$_2$O)$_f$—(CF(CF$_3$)CF$_2$O)]—CF$_2$CH$_2$—OC(O)CR$^1$=CH$_2$,
F—(CF$_2$CF$_2$CF$_2$O)$_h$—CF$_2$CF$_2$CH$_2$—OC(O)CR$^1$=CH$_2$,
F—(CF(CF$_3$)CF$_2$O)$_i$—CF$_2$CH$_2$—OC(O)CR$^1$=CH$_2$,
F—(CF(CF$_3$)CF$_2$O)$_i$—CF(CF$_3$)CH$_2$—OC(O)CR$^1$=CH$_2$,
F—CF$_2$O—(CF$_2$CF$_2$O)$_g$—CF$_2$CH$_2$—OC(O)CR$^1$=CH$_2$,
F—[(CF$_2$CHFO)$_q$—(CF$_2$CF$_2$CF$_2$CH$_2$O)$_k$]—CF$_2$CF$_2$CF$_2$CH$_2$—OC(O)CR$^1$=CH$_2$,
F—[(CF$_2$CF$_2$O)$_g$—(CF$_2$CF$_2$CF$_2$CF$_2$O)$_j$]—CF$_2$CF$_2$CF$_2$CH$_2$—OC(O)CR$^1$=CH$_2$,
HOCH$_2$—[(CF$_2$CF$_2$O)$_{i1}$—(CF$_2$O)$_{j1}$]—CF$_2$CH$_2$—OC(O)CR$^1$=CH$_2$,
HOCH$_2$—[(CF(CF$_3$)CF$_2$O)$_{k1}$—(CF$_2$O)$_{j2}$]—CF$_2$CH$_2$—OC(O)CR$^1$=CH$_2$, etc.

R$^1$, f, g, h, i, j, k, q, i1, j1, j2 and k1 are as defined above.
G is a monofunctional or difunctional urethane (meth)acrylate structure.

The monofunctional urethane (meth)acrylate structure may, for example, be CH$_2$=CR$^1$C(O)O—C(O)NH—, CH$_2$=CR$^1$C(O)O—(CH$_2$)$_{n1}$OC(O)NH—, CH$_2$=CR$^1$C(O)O-Q-OC(O)NH—, etc. The difunctional urethane (meth)acrylate structure may, for example, be —CF$_2$CH$_2$OCH$_2$CH{—OC(O)NH—(CH$_2$)$_{n1}$OC(O)CR$^1$=CH$_2$}CH$_2$—OC(O)NH—(CH$_2$)$_{n1}$OC(O) CR$^1$=CH$_2$, etc.

As the compound (5), a compound represented by the following formula (II-1) and a compound represented by the following formula (II-2) are preferred.

F—Z$^3$—Y$^3$—OC(O)CR$^1$=CH$_2$     (II-1)

G$^1$-Y$^4$—Z$^3$—Y$^3$-G$^1$     (II-2)

Here, Z$^3$ is —(CF$_2$O)$_f$—(CF$_2$CF$_2$O)$_g$—, —(CF$_2$O)$_f$—(CF(CF$_3$)CF$_2$O)$_i$—, —(CF$_2$CF$_2$CF$_2$O)$_h$—, or —(CF(CF$_3$)CF$_2$O)$_i$—.

$Y^3$ is $-(CF_2)_c(CH_2)_c-$, or $-CF(CF_3)CH_2-$.

$G^1$ is $CH_2=CR^1C(O)O-$, $CH_2=CR^1C(O)O-C(O)NH-$, $CH_2=CR^1C(O)O-(CH_2)_{n1}OC(O)NH-$, or $CH_2=CR^1C(O)O-Q-OC(O)NH-$.

$Y^4$ is $-CF_2-$, or $-(CF_2)_c(CH_2)_c-$.

Further, $R^1$, Q, c, f, g, h, i and n1 have the same meanings as defined above.

As the compound (5), the following compounds are more preferred.

$CH_2=CR^1C(O)O-CH_2CF_2O-[(CF_2O)_{f1}-(CF_2CF_2O)_{g1}]-CF_2CH_2-OC(O)CR^1=CH_2$, $CH_2=CR^1C(O)O-CH_2CF_2O-[(CF_2O)_{f1}-(CF(CF_3)CF_2O)_{i1}]-CF_2CH_2-OC(O)CR^1=CH_2$, $CH_2=CR^1C(O)O-CH_2CF_2O-(CF_2CF_2CF_2O)_{h1}-CF_2CF_2CH_2-OC(O)CR^1=CH_2$, $CH_2=CR^1C(O)O-CH_2CF_2O-(CF(CF_3)CF_2O)_{i2}-CF_2CH_2-OC(O)CR^1=CH_2$, $CH_2=CR^1C(O)O-CH_2CF_2O-(CF_2CF_2O)_{g1}-CF_2CH_2-OC(O)CR^1=CH_2$,

G-$CH_2CF_2O-[(CF_2O)_{f1}-(CF_2CF_2O)_{g1}]-CF_2CH_2$-G,

G-$CH_2CF_2O-[(CF_2O)_{f1}-(CF(CF_3)CF_2O)_{i1}]-CF_2CH_2$-G,

G-$CH_2CF_2CF_2O-(CF_2CF_2CF_2O)_{h1}-CF_2CF_2CH_2$-G,

G-$CH_2CF_2O-(CF(CF_3)CF_2O)_{i2}-CF_2CH_2$-G,

G-$CH_2CF_2O-(CF_2CF_2O)_{g1}-CF_2CH_2$-G,

F-$[(CF_2O)_{f1}-(CF_2CF_2O)_{g1}]-CF_2CH_2-OC(O)CR^1=CH_2$,

F-$[(CF_2O)_{f1}-(CF(CF_3)CF_2O)_{i1}]-CF_2CH_2-OC(O)CR^1=CH_2$,

F-$(CF_2CF_2CF_2O)_{h1}-CF_2CF_2CH_2-OC(O)CR^1=CH_2$,

F-$(CF(CF_3)CF_2O)_{i2}-CF_2CH_2-OC(O)CR^1=CH_2$,

F-$(CF(CF_3)CF_2O)_{i2}-CF(CF_3)CH_2-OC(O)CR^1=CH_2$,

F-$CF_2O-(CF_2CF_2O)_{i2}-CF_2CH_2-OC(O)CR^1=CH_2$.

Here, f1, f2, g1, h1, i1 and i2 are as defined above.

The compound (5) is available as Fomblin (registered trademark) MT70, Fluorolink (registered trademark) MD700, or Fluorolink (registered trademark) AD1700, manufactured by Solvay Specialty Polymers.

Further, the compound (5) can be synthesized by selecting a poly(oxy polyfluoroalkylene)-containing compound having a desired molecular weight or a derivative of such a poly(oxypolyfluoroalkylene)-containing compound, from Fluorolink (registered trademark), Fomblin (registered trademark), manufactured by Solvay Specialty Polymers, DEMNUM (registered trademark) manufactured by Daikin Industries, Ltd. and Krytox (registered trademark) manufactured by DuPont, and using such a compound as the starting material. For example, a poly(oxypolyfluoroalkylene)-containing compound with its terminal methyl-esterified is reduced in absolute ethanol in the presence of sodium borohydride, to obtain the compound having an OH group at the terminal, whereupon it is reacted with acrylic acid chloride in dehydrated acetone in the presence of triethylamine, to obtain a compound (5).

Monomer (d):

The monomer (d) is a halogenated olefin.

By combining (b) units and (d) units, the adhesion to an article will be improved, and therefore, the heavy-rain durability of an article treated by using the water/oil repellent composition will be further improved.

As the halogenated olefin, a compound represented by the following formula (6) may be mentioned.

$$R^4R^5C=CR^6R^7 \quad (6)$$

$R^4$, $R^5$, $R^6$ and $R^7$ are, each independently, a hydrogen atom, a halogen atom or a $C_{1-3}$ perfluoroalkyl group. However, at least one of $R^4$, $R^5$, $R^6$ and $R^7$ is a halogen atom or a $C_{1-3}$ perfluoroalkyl group. The perfluoroalkyl group is $CF_3-$, $C_2F_5-$ or $C_3F_7-$.

The halogenated olefin is preferably a chlorinated olefin, or a fluorinated olefin.

As the halogenated olefin, tetrafluoroethylene, or a compound represented by the following formula (7) is preferred.

$$R^8HC=CR^9R^{10} \quad (7)$$

$R^8$, $R^9$ and $R^{10}$ are each independently a hydrogen atom, a chlorine atom, a fluorine atom or a $C_{1-3}$ perfluoroalkyl group. However, at least one of $R^8$, $R^9$ and $R^{10}$ is a chlorine atom, a fluorine atom or a $C_{1-3}$ perfluoroalkyl group.

As a specific example of the halogenated olefin, preferred is vinyl chloride, vinylidene chloride, tetrafluoroethylene, vinylidene fluoride, or 2,3,3,3-tetrafluoro-1-propene, and from the viewpoint of adhesion to an article, more preferred is vinyl chloride, vinylidene chloride, or 2,3,3,3-tetrafluoro-1-propene.

Monomer (e):

The monomer (e) is a monomer having a crosslinkable functional group (excluding monomer (c)).

When the copolymer has (e) units, the durability (wash durability and heavy-rain durability) of an article treated by using the water/oil repellent composition will be further improved.

As the crosslinkable functional group, preferred is a functional group having at least one bond among a covalent bond, an ionic bond and a hydrogen bond, or a functional group capable of forming a crosslinked structure by interaction of such bonds.

As such a functional group, preferred is an isocyanate group, a blocked isocyanate group, an alkoxysilyl group, an amino group, an alkoxymethyl amide group, a silanol group, an ammonium group, an amide group, an epoxy group, a hydroxy group, an oxazoline group, a carboxy group, an alkenyl group, a sulfone acid group, etc. Particularly preferred is an epoxy group, a hydroxy group, a blocked isocyanate group, an alkoxysilyl group, an amino group or a carboxy group.

As the monomer (e), (meth)acrylates, acrylamides, vinyl ethers, or vinyl esters are preferred.

As the monomer (e), the following compounds may be mentioned.

2-Isocyanatoethyl (meth)acrylate, 3-isocyanatopropyl (meth)acrylate, 4-isocyanatobutyl (meth)acrylate, a 2-butanone oxime adduct of 2-isocyanatoethyl (meth)acrylate, a pyrazole adduct of 2-isocyanatoethyl (meth)acrylate, a 3,5-dimethyl pyrazole adduct of 2-isocyanatoethyl (meth)acrylate, a 3-methylpyrazole adduct of 2-isocyanatoethyl (meth)acrylate, an ε-caprolactam adduct of 2-isocyanatoethyl (meth)acrylate, a 2-butanone oxime adduct of 3-isocyanatopropyl (meth)acrylate, a pyrazole adduct of 3-isocyanatopropyl (meth)acrylate.

A 3,5-dimethylpyrazole adduct of 3-isocyanatopropyl (meth)acrylate, a 3-methylpyrazole adduct of 3-isocyanatopropyl (meth)acrylate, an ε-caprolactam adduct of 3-isocyanatopropyl (meth)acrylate, a 2-butanone oxime adduct of 4-isocyanatobutyl (meth)acrylate, a pyrazole adduct of 4-isocyanatobutyl (meth)acrylate, a 3,5-dimethylpyrazole adduct of 4-isocyanatobutyl (meth)acrylate, a 3-methylpyrazole adduct of 4-isocyanatobutyl (meth)acrylate, an ε-caprolactam adduct of 4-isocyanatobutyl (meth)acrylate.

Methoxymethyl (meth)acrylamide, ethoxymethyl (meth)acrylamide, butoxymethyl (meth)acrylamide, diacetone acrylamide, 3-methacryloyloxy propyl trimethoxy silane, trimethoxy vinyl silane, vinyl trimethoxysilane, dimethylaminoethyl (meth)acrylate, diethylaminoethyl (meth)acrylate, dimethylaminopropyl (meth)acrylate, (meth)acryloyl morpholine, (meth)acryloyloxyethyl trimethyl ammonium chloride, (meth)acryloyloxy propyl trimethyl ammonium chloride, (meth)acrylamide-ethyl trimethylammonium chloride, (meth)acrylamide propyl trimethyl ammonium chloride.

t-Butyl (meth)acrylamide sulfonic acid, (meth)acrylamide, N-methyl (meth)acrylamide, N-methylol (meth)acrylamide, N-butoxymethyl (meth)acrylamide, diacetone (meth) acrylamide, glycidyl (meth)acrylate, 2-hydroxyethyl (meth) acrylate, 2-hydroxypropyl (meth)acrylate, 4-hydroxybutyl (meth)acrylate, 3-chloro-2-hydroxypropyl methacrylate, a polyoxyalkylene glycol mono(meth)acrylate, (meth)acrylic acid, 2-(meth)acryloyloxyethyl succinic acid, 2-(meth)acryloyloxyhexahydrophthalic acid, 2-(meth)acryloyloxyethyl acid phosphate, allyl (meth)acrylate, 2-vinyl-2-oxazoline, a polycaprolactone ester of 2-vinyl-4-methyl-(2-vinyl-oxazoline)hydroxyethyl (meth)acrylate.

Tri(meth)allyl isocyanurate (T(M)AIC, manufactured by Nippon Kasei Chemical Co., Ltd.), triallyl cyanurate (TAC, manufactured by Nippon Kasei Chemical Co., Ltd.), 3-(methyl ethyl ketoxime) isocyanatomethyl-3,5,5-trimethylcyclohexyl(2-hydroxyethyl methacrylate) cyanate (Tech Court HE-6P, manufactured by Kyokenkasei), a poly-fluoroether having a hydroxyl group ($CF_2$=$CFOCF_2CF_2CF_2CH_2OH$, etc.).

As the monomer (e), preferred is N-methylol (meth) acrylamide, N-butoxymethyl (meth)acrylamide, 2-hydroxyethyl (meth)acrylate, 4-hydroxybutyl (meth)acrylate, a 3,5-dimethylpyrazole adduct of 2-isocyanatoethyl (meth) acrylate, a 3,5-dimethylpyrazole adduct of 3-isocyanatopropyl (meth)acrylate, diacetone acrylamide, glycidyl methacrylate, a polycaprolactone ester of hydroxyethyl (meth)acrylate, a polycaprolactone ester of hydroxyethyl (meth)acrylate, or Tech coat HE-6P. As the monomer (e), particularly preferred is N-methylol (meth)acrylamide, 2-hydroxyethyl (meth)acrylate, 4-hydroxybutyl (meth)acrylate, a 3,5-dimethyl pyrazole adduct of 2-isocyanatoethyl (meth)acrylate, or a 3,5-dimethylpyrazole adduct of 3-isocyanatopropyl (meth)acrylate.

Monomer (f):

The monomer (f) is a monomer other than the monomer (a), monomer (b), monomer (c), monomer (d) and monomer (e). The monomer (f) is preferably a monomer containing no perfluoroalkyl group having 7 or more carbon atoms. In particular, a monomer containing no fluorine atom (non-fluorinated monomer) is preferred.

As the monomer (f), the following compounds may be mentioned. Methyl acrylate, ethyl acrylate, propyl acrylate, butyl (meth)acrylate, cyclohexyl (meth)acrylate, 2-ethylhexyl (meth)acrylate, n-hexyl (meth)acrylate, vinyl acetate, vinyl propionate, butene, isoprene, butadiene, ethylene, propylene, vinyl ethylene, pentene, ethyl-2-propylene, butyl ethylene, cyclohexyl propyl ethylene, decyl ethylene, dodecyl ethylene, hexene, iso-hexyl ethylene, neopentyl ethylene, (1,2-diethoxycarbonyl) ethylene, (1,2-dipropoxycarbonyl) ethylene, methoxyethylene, ethoxyethylene, butoxy ethylene, 2-methoxypropylene, pentyloxyethylene, cyclopentanoyloxyethylene, cyclopentyl acetoxyethylene, styrene, α-methyl styrene, p-methyl styrene, hexyl styrene, octyl styrene, nonyl styrene, chloroprene.

N,N-dimethyl (meth)acrylamide, a vinyl alkyl ether, a halogenated alkyl vinyl ether, a vinyl alkyl ketone, butyl acrylate, propyl methacrylate, benzyl (meth)acrylate, octyl (meth)acrylate, decyl methacrylate, cyclododecyl acrylate, 3-ethoxypropyl acrylate, methoxy-butyl acrylate, 2-ethylbutyl acrylate, 1,3-dimethylbutyl acrylate, 2-methylpentyl acrylate, aziridinyl ethyl (meth)acrylate, a 2-ethylhexyl polyoxyalkylene (meth)acrylate, a polyoxyalkylene di(meth)acrylate.

A crotonic acid alkyl ester, a maleic acid alkyl ester, a fumaric acid alkyl ester, a citraconic acid alkyl ester, a mesaconic acid alkyl ester, triallyl cyanurate, allyl acetate, N-vinyl carbazole, maleimide, N-methyl maleimide, a (meth)acrylate having silicone in its side chain, a (meth) acrylate having a urethane bond, a (meth)acrylate having a polyoxyalkylene chain having a $C_{1-4}$ alkyl group at its terminal, an alkylene di(meth)acrylate.

The proportion of (a) units is, from the viewpoint of water/oil repellency and durability of an article treated by using the water/oil repellent composition, preferably from 5 to 40 mass %, more preferably from 10 to 25 mass %, among the structural units (100 mass %) based on all monomers constituting the copolymer.

The proportion of (b) units is, from the viewpoint of water/oil repellency and durability of an article treated by using the water/oil repellent composition, preferably from 40 to 94.9 mass %, more preferably from 40 to 84.9 mass %, among the structural units (100 mass %) based on all monomers constituting the copolymer.

The proportion of (c) units is, from the viewpoint of water/oil repellency and durability of an article treated by using the water/oil repellent composition, preferably from 0.1 to 20 mass %, more preferably from 0.1 to 10 mass %, further preferably from 0.1 to 5 mass %, among the structural units (100 mass %) based on all monomers constituting the copolymer.

(d) Units to (f) units are optional structural units.

The proportion of (d) units is, from the viewpoint of water/oil repellency and durability of an article treated by using the water/oil repellent composition, preferably from 0 to 30 mass %, more preferably from 3 to 25 mass %, among the structural units (100 mass %) based on all monomers constituting the copolymer.

The proportion of (e) units is, from the viewpoint of water/oil repellency and durability of an article treated by using the water/oil repellent composition, preferably from 0 to 20 mass %, more preferably from 0 to 10 mass %, among the structural units (100 mass %) based on all monomers constituting the copolymer.

The proportion of (f) units is, from the viewpoint of water/oil repellency and durability of an article treated by using the water/oil repellent composition, preferably from 0 to 35 mass %, more preferably from 0 to 20 mass %, among the structural units (100 mass %) based on all monomers constituting the copolymer.

The proportion of structural units based on a monomer in the present invention is calculated based on the charged amount of the monomer at the time of production of the copolymer.

The proportion of structural units being 0 mass %, means that such monomer units are not present, or, even if they are present, cannot be detected by a usual analytical means.

The mass average molecular weight (Mw) of the copolymer is preferably from 8,000 to 1,000,000, more preferably from 10,000 to 800,000. When the mass average molecular weight (Mw) of the copolymer is in the above range, it is possible to express both water repellency and oil repellency.

The number average molecular weight (Mn) of the copolymer is preferably from 3,000 to 800,000, more preferably from 5,000 to 600,000. When the number average molecular weight (Mn) of the copolymer is in the above range, it is possible to express both water repellency and oil repellency.

As preferred embodiments of the copolymer of the present invention, copolymers comprising structural units based on the following monomers may be mentioned.

A compound represented by the formula (1)/stearyl (meth)acrylate/a compound represented by the formula (II-1)

A compound represented by the formula (1)/behenyl (meth)acrylate/a compound represented by the formula (II-1)

A compound represented by the formula (1)/stearyl (meth)acrylate/a compound represented by the formula (II-2) A compound represented by the formula (1)/behenyl (meth)acrylate/a compound represented by the formula (II-2) (Liquid medium)

The liquid medium may, for example, be water, an alcohol, a glycol, a glycol ether, a glycol ester, a halogenated compound, a hydrocarbon, a ketone, an ester, an ether, a nitrogen compound, a sulfur compound, an inorganic solvent, an organic acid, etc. From the viewpoint of solubility and handling efficiency, preferred is at least one liquid medium selected from the group consisting of water, alcohols, glycols, glycol ethers and glycol esters.

The alcohol may, for example, be methanol, ethanol, 1-propanol, 2-propanol, 1-butanol, 2-butanol, 2-methyl-propanol, 1,1-dimethylethanol, 1-pentanol, 2-pentanol, 3-pentanol, 2-methyl-1-butanol, 3-methyl-1-butanol, 1,1-dimethylpropanol, 3-methyl-2-butanol, 1,2-dimethylpropanol, 1-hexanol, 2-methyl-1-pentanol, 4-methyl-2-pentanol, 2-ethyl-1-butanol, 1-heptanol, 2-heptanol, 3-heptanol, 3-methoxy-3-methyl-1-butanol, etc.

The glycol or glycol ether may, for example, be ethylene glycol, ethylene glycol monomethyl ether, ethylene glycol monoethyl ether, ethylene glycol monobutyl ether, ethylene glycol monomethyl ether acetate, propylene glycol monomethyl ether acetate, diethylene glycol monobutyl ether acetate, diethylene glycol monoethyl ether acetate, ethylene glycol monoethyl ether acetate, ethylene glycol monobutyl ether acetate, propylene glycol, propylene glycol monomethyl ether, propylene glycol monoethyl ether, propylene glycol dimethyl ether, dipropylene glycol, dipropylene glycol monomethyl ether, dipropylene glycol dimethyl ether, dipropylene glycol monoethyl ether, tripropylene glycol, tripropylene glycol monomethyl ether, polypropylene glycol, hexylene glycol, etc.

The halogenated compound may, for example, be a halogenated hydrocarbon, a halogenated ether, etc.

The halogenated hydrocarbon may, for example, be a hydrochlorofluorocarbon, a hydrofluorocarbon, a hydrobromocarbon, etc.

The halogenated ether may, for example, be a hydrofluoroether, etc.

The hydrofluoroether may, for example, be a separation type hydrofluoroether, or a non-separation type hydrofluoroether. The separation type hydrofluoroether is a compound wherein a $R^F$ group or a perfluoroalkylene group, and an alkyl group or an alkylene group are bonded via an etheric oxygen atom. The non-separation type hydrofluoroether is a hydrofluoroether containing a partially fluorinated alkyl or alkylene group.

The hydrocarbon may, for example, be an aliphatic hydrocarbon, an alicyclic hydrocarbon, an aromatic hydrocarbon, etc.

The aliphatic hydrocarbon may, for example, be pentane, 2-methylbutane, 3-methylpentane, hexane, 2,2-dimethylbutane, 2,3-dimethylbutane, heptane, octane, 2,2,4-trimethylpentane, 2,2,3-trimethyl hexane, decane, undecane, dodecane, 2,2,4,6,6-penta-methyl heptane, tridecane, tetradecane, hexadecane, etc.

The alicyclic hydrocarbon may, for example, be cyclopentane, methylcyclopentane, cyclohexane, methylcyclohexane, ethylcyclohexane, etc.

The aromatic hydrocarbon may, for example, be benzene, toluene, xylene, etc.

The ketone may, for example, be acetone, methyl ethyl ketone, 2-pentanone, 3-pentanone, 2-hexanone, methyl isobutyl ketone, etc.

The ester may, for example, be methyl acetate, ethyl acetate, butyl acetate, methyl propionate, methyl lactate, ethyl lactate, pentyl lactate, etc.

The ether may, for example, be diisopropyl ether, dioxane, tetrahydrofuran, etc.

The nitrogen compound may, for example, be pyridine, N,N-dimethylformamide, N,N-dimethylacetamide, N-methylpyrrolidone, 3-methoxy N,N-dimethylpropionamide, 3-butoxy N,N-dimethylpropionamide, etc.

The sulfur compound may, for example, be dimethyl sulfoxide, sulfolane, etc.

The inorganic solvent may be liquid carbon dioxide.

The organic acid may, for example, be acetic acid, propionic acid, malic acid, lactic acid, etc.

As the liquid medium, one type may be used alone, or two or more types may be used as mixed. When two or more liquid media are to be used as a mixture, it is preferred to use a mixture with water. By using a mixed liquid medium, control of the solubility and dispersibility of the copolymer will be easy, and control of the permeability, wettability, solvent drying rate, etc. to an article during the processing, will be easy.

The water/oil repellent composition of the present invention contains, when made into a composition containing 20 mass % of the copolymer, the above-mentioned liquid medium other than water in an amount of preferably from 0 to 40 mass %, more preferably from 1 to 20 mass %.

(Surfactant)

The surfactant may be a hydrocarbon-type surfactant or a fluorinated surfactant, and each may be an anionic surfactant, a nonionic surfactant, a cationic surfactant or an amphoteric surfactant.

As the surfactant, from the viewpoint of compatibility with additives, it is preferred to use a nonionic surfactant and amphoteric surfactant in combination, and from the viewpoint of stability of the copolymer, it is preferred to use a nonionic surfactant alone, or to use a nonionic surfactant and a cationic surfactant in combination.

The ratio of a nonionic surfactant to a cationic surfactant (nonionic surfactant/cationic surfactant) is preferably from 97/3 to 40/60 (mass ratio).

As the nonionic surfactant, preferred is at least one member selected from the group consisting of surfactants $s^1$ to $s^6$ as disclosed in WO2010/047258 and WO2010/123042, and amidoamine surfactants as disclosed in Japanese Patent No. 5569614.

When the surfactant contains a cationic surfactant, as such a cationic surfactant, preferred is surfactant $s^7$ as disclosed in WO2010/047258 and WO2010/123042.

When the surfactant contains an amphoteric surfactant, as such an amphoteric surfactant, preferred is surfactant $s^8$ as disclosed in WO2010/047258 and WO2010/123042.

Further, as the surfactant, surfactant $s^9$ (polymeric surfactant) as disclosed in WO2010/047258 and WO2010/123042 may be used.

A preferred embodiment of the surfactant is similar to the preferred embodiment as disclosed in WO2010/047258 and WO2010/123042.

As preferred examples of the nonionic surfactant, the following compounds may be mentioned.

$C_{18}H_{37}O[CH_2CH(CH_3)O]_2$—$(CH_2CH_2O)_{30}H$,
$C_{18}H_{35}O$—$(CH_2CH_2O)_{26}H$,
$C_{18}H_{35}O$—$(CH_2CH_2O)_{30}H$,
$C_{16}H_{33}O[CH_2CH(CH_3)O]_5$—$(CH_2CH_2O)_{20}H$,
$C_{12}H_{25}O[CH_2CH(CH_3)O]_2$—$(CH_2CH_2O)_{15}H$,
$(C_8H_{17})(C_6H_{13})CHO$—$(CH_2CH_2O)_{15}H$,
$C_{10}H_{21}O[CH_2CH(CH_3)O]_2$—$(CH_2CH_2O)_{15}H$,
$C_6F_{13}CH_2CH_2O$—$(CH_2CH_2O)_{15}H$,
$C_6F_{13}CH_2CH_2O[CH_2CH(CH_3)O]_2$—$(CH_2CH_2O)_{15}H$,
$C_4F_9CH_2CH_2O[CH_2CH(CH_3)O]_2$—$(CH_2CH_2O)_{15}H$,
HO—$(CH_2CH_2O)_{15}$—$(C_3H_{60})_{35}$—$(CH_2CH_2O)_{15}H$,
HO—$(CH_2CH_2O)_8$—$(C_3H_{60})_{35}$—$(CH_2CH_2O)_8H$,
HO—$(CH_2CH_2O)_9$—$(C_3H_{60})_{20}$—$(CH_2CH_2O)_9H$,
HO—$(CH_2CH_2O)_{45}$—$(C_3H_{60})_{17}$—$(CH_2CH_2O)_{45}H$,
HO—$(CH_2CH_2O)_{34}$—$(CH_2CH_2CH_2CH_2O)_{28}$—$(CH_2CH_2O)_{34}H$.

As specific preferred examples of the cationic surfactant, the following compounds may be mentioned.

Stearyl trimethyl ammonium chloride,
Stearyl dimethyl monoethyl ammonium ethyl sulfate,
Stearyl monomethyl di(polyethylene glycol) ammonium chloride,
Fluorohexyl trimethyl ammonium chloride,
Di(tallow alkyl) dimethyl ammonium chloride,
Dimethyl monococonut amine acetate,
Amidoamine quaternary ammonium salts as disclosed in Japanese Patent No. 5,569,614.

As preferred specific examples of the amphoteric surfactant, the following compounds may be mentioned.

Dodecyl betaine,
Stearyl betaine,
Dodecyl carboxymethyl hydroxyethyl imidazolinium betaine,
Dodecyl dimethyl amino acetic acid betaine,
Fatty acid amide propyl dimethyl amino acetic acid betaine.

The total amount of surfactants is preferably from 1 to 10 parts by mass, more preferably from 2 to 8 parts by mass, to the copolymer (100 parts by mass).

(Additives)

Additives may, for example, be a penetrating agent, a defoaming agent, a water-absorbing agent, an antistatic agent, an anticrease agent, a texture modifier, a coalescent, a water-soluble polymer (polyacrylamide, polyvinyl alcohol, etc.), a thermosetting agent (a melamine resin, an urethane resin, etc.), an epoxy curing agent (isophthalic acid dihydrazide, adipic acid dihydrazide, sebacic acid dihydrazide, dodecanedioic acid dihydrazide, 1,6-hexamethylene bis (N,N-dimethyl semicarbazide), 1,1,1',1'-tetramethyl-4,4'-(methylene-di-para-phenylene)disemicarbazide, Spiro glycol, etc.), a thermosetting catalyst, a crosslinking catalyst, a synthetic resin, a fiber stabilizing agent, etc.

(Method for Producing Water/Oil Repellent Composition)

The water/oil repellent composition of the present invention may be produced, for example, by the following method (i) or (ii).

(i) A method wherein in the presence of a surfactant and a polymerization initiator, monomer components comprising monomers (a) to (c) and, as the case requires, monomers (d) to (f), are polymerized in a liquid medium to obtain a solution, dispersion or emulsion of a copolymer, and thereafter, as the case requires, other liquid media, other surfactants, additives, etc. are added.

(ii) A method wherein in the presence of a surfactant and a polymerization initiator, monomer components comprising monomers (a) to (c) and, as the case requires, monomers (d) to (f), are polymerized in a liquid medium to obtain a solution, dispersion or emulsion of a copolymer, and thereafter, the copolymer is separated, and to the copolymer, a liquid medium, a surfactant, and, as the case requires, an additive, are added.

The polymerization method may, for example, be a dispersion polymerization method, an emulsion polymerization method, a suspension polymerization method, etc.

As the method for producing the water/oil repellent composition, preferred is a method wherein in the presence of a surfactant and a polymerization initiator, monomer components comprising monomers (a) to (c) and, as the case requires, monomer (d) to (f), are emulsion-polymerized in an aqueous liquid medium to obtain an emulsion of a copolymer.

With a view to improving the yield of the copolymer, it is preferred to pre-emulsify a mixture comprising the monomers, the surfactant and the aqueous liquid medium, prior to the emulsion polymerization. For example, the mixture of the monomers, the surfactant and the aqueous liquid medium is mixed and dispersed by a homomixer or a high pressure emulsifier.

As the polymerization initiator, a thermal polymerization initiator, a photopolymerization initiator, a radiation polymerization initiator, a radical polymerization initiator, an ionic polymerization initiator, etc. may be mentioned, and a water-soluble or oil-soluble radical polymerization initiator is preferred.

As the radical polymerization initiator, a commonly employed initiator such as an azo polymerization initiator, a peroxide polymerization initiator or a redox initiator is used depending on the polymerization temperature. As the radical polymerization initiator, an azo compound is particularly preferred, and in a case where the polymerization is carried out in an aqueous liquid medium, a salt of the azo compound is more preferred. The polymerization temperature is preferably from 20 to 150° C.

In the polymerization of monomers, a molecular weight modifier may be used. As the molecular weight modifier, an aromatic compound, a mercapto alcohol or a mercaptan is preferred, and an alkyl mercaptan is particularly preferred. Such a molecular weight modifier may, for example, be mercaptoethanol, n-octyl mercaptan, n-dodecyl mercaptan, t-dodecyl mercaptan, stearyl mercaptan, α-methylstyrene dimer ($CH_2$=$C(Ph)CH_2C(CH_3)_2Ph$, wherein Ph is a phenyl group), etc.

The proportions of the monomers (a) to (f) are, since no monomers remaining after polymerization are substantially detected, the same as the respective proportions of the above-described (a) units to (f) units, and the preferred embodiments are also the same.

The water/oil repellent composition of the present invention is preferably such that the copolymer is dispersed as particles in a liquid medium. The average particle size of the copolymer is preferably from 10 to 1,000 nm, more preferably from 10 to 300 nm, particularly preferably from 10 to 200 nm. When the average particle size is within such a range, it is not necessary to use a surfactant or the like in a large amount, water/oil repellency is good, discoloration does not occur when a dyed fabric is treated, and dispersed particles can exist stably in the liquid medium without precipitation. The average particle diameter of the copolymer may be measured by a dynamic light scattering apparatus, an electron microscope, etc.

The solid content concentration of the water/oil repellent composition of the present invention, is preferably from 25 to 40 mass % in the water/oil repellent composition (100 mass %) immediately after the production of the water/oil repellent composition.

At the time of treating an article, the solid content concentration of the water/oil repellent composition of the present invention is preferably from 0.2 to 5 mass % in the water/oil repellent composition (100 mass %).

The solid content concentration of the water/oil repellent composition is calculated from the mass of the water/oil repellent composition before heating and the mass after drying for 4 hours by a convection dryer at 120° C.

Advantageous Effects

The water/oil repellent composition of the present invention as described above, contains a copolymer having not only (a) units and (b) units, but also (c) units, and therefore, by treating an article by using the water/oil repellent composition, it is possible to obtain the article which is excellent in each of water repellency, oil repellency, heavy-rain durability and texture.

Further, in the water/oil repellent composition of the present invention, the copolymer does not require, as essential, structural units based on a monomer having a $R^F$ group with at least 7 carbon atoms, and the copolymer should rather better not to contain such structural units, whereby the content (content in a case where the solid content concentration is 20%) of perfluorooctanoic acid (PFOA) or perfluorooctane sulfonic acid (PFOS) and its precursors or analogues, of which impact on the environment has been pointed out, can be made to be below the detection limit as an analytical value of LC-MS/MS in accordance with the method disclosed in WO2009/081822.

<Article>

The article of the present invention is an article treated by using the water/oil repellent composition of the present invention.

The article to be treated with the water/oil repellent composition of the present invention may, for example, be fibers (natural fibers, synthetic fibers, blended fibers, etc.), various fiber products, nonwoven fabrics, resins, paper, leather, wood, metal, stone, concrete, plaster, glass, etc.

The treating method may, for example, be a method of applying or impregnating the water/oil repellent composition to an article by a known coating method, followed by drying.

When the article is treated by using the water/oil repellent composition of the present invention, the coating film becomes flexible, whereby in the case of a fiber product, the texture becomes flexible, and it becomes possible to impart high quality water/oil repellency to the article. Also, adhesion of the surface will be excellent, whereby the water/oil repellency can be imparted even by curing at a low temperature. Further, a decrease in performance due to friction or washing is less, whereby initial performance in the processing can be stably maintained. Further, when treatment is applied to paper, even under low temperature drying conditions, excellent sizing properties, water repellency and oil resistance can be imparted to the paper. When treatment is applied to e.g. a resin, glass or metal surface, it is possible to form a water/oil repellent coating film which is good in adhesion to an article and is excellent in film-forming properties.

EXAMPLES

Now, the present invention will be described in detail with reference to Examples, but the present invention is not limited thereto.

Ex. 1 to 4 and 8 to 10 are Examples of the present invention, and Ex. 5 to 7 and 11 are Comparative Examples.

(Water Repellency)

With respect to a test cloth, water repellency was evaluated in accordance with the spray test of JIS L1092. Water repellency was represented by five grades of 1 to 5. The larger the score, the better the water repellency. A grade marked with +(−) indicates that the property is slightly better (worse) than a standard level of the grade.

(Friction Durability of Water Repellency)

Using a friction tester, a friction surface of a test cloth was abraded 1,000 times and air-dried overnight in a room at a temperature of 25° C. with a humidity of 55%, whereupon the water repellency of the friction surface of the test cloth was evaluated.

(Wash Durability of Water Repellency)

With respect to a test cloth, washing with water was repeated 10 times or 20 times in accordance with the water washing method of Annex 103 of JIS L0217. After the washing, air drying was carried out overnight in a room at a temperature of 25° C. with a humidity of 55%, whereupon the water repellency of the test cloth was evaluated.

(Oil Repellency)

With respect to a test cloth, oil repellency was evaluated in accordance with the test method of AATCC-TM118-1966. Oil repellency was represented by the grades shown in Table 1. A grade marked with +(−) indicates that the property is slightly better (worse).

TABLE 1

| Oil repellency No. | Test solution | Surface tension (25° C.) [mN/m] |
|---|---|---|
| 8 | n-heptane | 19.8 |
| 7 | n-octane | 21.4 |
| 6 | n-decane | 23.5 |
| 5 | n-dodecane | 24.7 |
| 4 | n-tetradecane | 26.4 |
| 3 | n-hexadecane | 27.3 |
| 2 | 65 parts of Nujol/35 parts of hexadecane | 29.6 |
| 1 | Nujol | 31.2 |
| 0 | Less than 1 | — |

(Heavy-Rain Durability)

With respect to a test cloth, the water repellency was evaluated by permitting rain to fall under such conditions that the amount of rainfall was 100 cc/minute, the rain water temperature was 20° C. and the rainfall time was 10 minutes, in accordance with the method (Bundesmann test) disclosed in JIS L1092 (C) method. Water repellency was represented by 5 grades of 1 to 5. The larger the score, the better the water repellency. A grade marked with +(−) indicates that the property is slightly better (worse).

(Washing Durability of Heavy-Rain Durability)

With respect to a test cloth, washing was repeated five times in accordance with the wash method of Annex 103 of JIS L0217. After the washing, air-drying was carried out overnight in a room at a temperature of 25° C. with a humidity of 55%, whereupon the heavy-rain durability of the test cloth was evaluated.

(Texture)

A test cloth was left to stand for one day and night in a constant temperature and humidity room at a room temperature of 20° C.±2° C. with a humidity of 65%±2%, whereupon by a sensory evaluation, the flexibility was judged under the following standards.
  ○: soft.
  Δ: normal.
  x: hard.
Abbreviations
Monomer (a):
  C6FMA: $C_6F_{13}C_2H_4OC(O)C(CH_3)=CH_2$.
Monomer (b):
  BeA: behenyl acrylate,
  STA: stearyl acrylate.
Monomer (c):
  PFPE-A: $F-CF_2O-(CF_2CF_2O)_{i2}-CF_2CH_2-OC(O)CH=CH_2$ (average of i2: 7),
  PFPE-B: $CH_2=C(CH_3)C(O)O-CH_2CF_2O-(CF_2CF_2O)_{i1}-(CF_2O)_{j1}-CF_2CH_2-OC(O)C(CH_3)=CH_2$ (i1/j1≈ 1 molar ratio, number-average molecular weight: about 1,000),
  PFPE-C: $CH_2=C(CH_3)C(O)O-CH_2CF_2O-(CF_2CF_2O)_{i1}-(CF_2O)_{j1}-CF_2CH_2-OC(O)C(CH_3)=CH_2$ (i1/j1≈ 1 molar ratio, number-average molecular weight: about 2,000),
  PFPE-D: $G-CH_2CF_2O-(CF_2CF_2O)_{i1}-(CF_2O)_{j1}-CF_2CH_2-G$ (G: monofunctional urethane methacrylate structure, manufactured by Solvay Specialty Polymers, Fluorolink (registered trademark) MD700),
  PFPE-E: $G-CH_2CF_2O-(CF_2CF_2O)_{i1}-(CF_2O)_{j1}-CF_2CH_2-G$ (G: 2-functional urethane methacrylate structure, manufactured by Solvay Specialty Polymers, Fomblin (registered trademark) MT70).
Monomer (d):
  VCI: vinyl chloride.
Monomer (e):
  HEMA: 2-hydroxyethyl methacrylate,
  N-MAM: N-methylolacrylamide.
Surfactant $s^1$:
  PEO-20: A 10 mass % aqueous solution of polyoxyethylene oleyl ether (manufactured by Kao Corporation, Emulgen (registered trademark) E430, about 30 mol adduct of ethylene oxide).
Surfactant $s^3$:
  P204: A 10 mass % aqueous solution of ethylene oxide propylene oxide polymerized product (manufactured by NOF Corporation, PLONON (registered trademark) 204, the proportion of ethylene oxide: 40 mass %).
Surfactant $s^7$:
  TMAC: A 63 mass % isopropyl alcohol and water mixed solution of stearyltrimethylammonium chloride.
Liquid Medium:
  DPM: dipropylene glycol monomethyl ether,
  Water: ion-exchanged water.
Molecular Weight Modifier:
  DoSH: n-dodecyl mercaptan.
Polymerization Initiator:
  VA061A: A 10 mass % aqueous solution of an acetate of 2,2'-azobis[2-(2-imidazolin-2-yl)propane] (manufactured by Wako Pure Chemical Industries, Ltd., VA061).
Perfluoropolyether:
  PFPE-1: perfluoropolyether diol (manufactured by Solvay Specialty Polymers, Fluorolink (registered trademark) D2),
  PFPE-2: perfluoropolyether diol (manufactured by Solvay Specialty Polymers, Fluorolink (registered trademark) D4000).

Ex. 1

In a glass beaker, 4.5 g of C6FMA, 15.0 g of BeA, 0.12 g of PFPE-A, 6.23 g of PEO-20, 0.25 g of TMAC, 1.25 g of P204, 15.0 g of DPM, 29.7 g of water, and 0.25 g of DoSH, were put and warmed for 30 minutes at 60° C., and then mixed by means of a homomixer (manufactured by Nippon Seiki Seisakusho Co., Ltd., BIO mixer) to obtain a mixed solution.

The obtained mixed solution was, while being maintained at 60° C., treated with 40 MPa by means of a high pressure emulsifier (manufactured by APV Lanier Co., Minilab) to obtain an emulsion. The obtained emulsion was put in a stainless steel reaction vessel and cooled to at most 40° C. 2.49 g of VA061A was added, and the gas phase was replaced with nitrogen, whereupon 5.4 g of VCI was added. With stirring, a polymerization reaction was conducted for 15 hours at 60° C., to obtain an emulsion of a copolymer. The proportions of structural units based on the respective monomers are shown in Table 3.

The emulsion of the copolymer was diluted with distilled water, to adjust the solid content concentration to 1 mass %, and then, a melamine resin crosslinking agent (manufactured by DIC Corporation, BECKAMINE (registered trademark) M3) and an acid catalyst (manufactured by DIC Corporation, Accelerator ACX), were added so that the respective concentrations became 0.3 mass %, to obtain a water/oil repellent composition.

In the water/oil repellent composition, a dyed nylon taffeta was dipped and squeezed so that each wet pick-up would be 45 mass %. This was dried at 110° C. for 60 seconds and then dried at 170° C. for 60 seconds, to obtain a test cloth. With respect to the test cloth, oil repellency, water repellency, friction durability of water repellency, wash durability of water repellency, heavy rain durability, washing durability of heavy rain durability and texture, were evaluated. The results are shown in Table 4.

Ex. 2 to 4, Ex. 7 to 11

An emulsion of a copolymer was obtained in the same manner as in Ex. 1 except that the types and/or charged amounts of monomers were changed to the amounts shown in Table 2. The proportions of structural units based on the respective monomers are shown in Table 3.

Except that the above emulsion was used, a water/oil repellent composition was obtained in the same manner as in Ex. 1.

Except that the above water/oil repellent composition was used, a test cloth was obtained in the same manner as in Ex. 1. With respect to the test cloth, oil repellency, water repellency, friction durability of water repellency, wash durability of water repellency, heavy rain durability, washing durability of heavy rain durability and texture, were evaluated. The results are shown in Table 4.

Ex. 5 and 6

An emulsion of a copolymer was obtained in the same manner as in Ex. 1 except that the types and/or charged amounts of monomers were changed to the amounts shown in Table 2, to obtain a mixed solution having a perfluoropolyether added. The proportions of structural units based on the respective monomers and perfluoropolyether are shown in Table 3.

Except that such an emulsion was used, in the same manner as Ex. 1, a water/oil repellent composition was obtained.

Except that such a water/oil repellent composition was used, a test cloth was obtained in the same manner as in Ex. 1. With respect to the test cloth, oil repellency, water repellency, friction durability of water repellency, wash durability of water repellency, heavy rain durability, wasing durability of heavy rain durability and texture, were evaluated. The results are shown in Table 4. h

TABLE 2

| | Charged amounts (g) | | | | | | | | | | | | | | |
|---|---|---|---|---|---|---|---|---|---|---|---|---|---|---|---|
| | Monomers | | | | | | | | | | | Other PFPE | | Surfactants | |
| | (a) | (d) | (b) | (e) | | | (c) | | | | | | S¹ | S⁷ | S³ |
| Ex. | C6FMA | VCl | BeA | STA | HEMA | N-MAM | PFPE-A | PFPE-B | PFPE-C | PFPE-D | PFPE-E | PFPE-1 PFPE-2 | PEO-20 | TMAC | P204 |
| 1 | 4.5 | 5.4 | 15.0 | | | | 0.12 | | | | | | 6.23 | 0.25 | 1.25 |
| 2 | 4.5 | 5.2 | 15.0 | | | | 0.25 | | | | | | 6.23 | 0.25 | 1.25 |
| 3 | 4.5 | 5.2 | 15.0 | | | | | 0.25 | | | | | 6.23 | 0.25 | 1.25 |
| 4 | 4.5 | 5.2 | 15.0 | | | | | | 0.25 | | | | 6.23 | 0.25 | 1.25 |
| 5 | 4.5 | 5.2 | 15.0 | | | | | | | | | 0.25 | 6.23 | 0.25 | 1.25 |
| 6 | 4.5 | 5.2 | 15.0 | | | | | | | | | 0.25 | 6.23 | 0.25 | 1.25 |
| 7 | 3.7 | 5.2 | 15.0 | | 0.12 | 0.92 | | | | | | | 6.23 | 0.25 | 1.25 |
| 8 | 4.5 | 5.4 | | 15.0 | | | 0.12 | | | | | | 6.23 | 0.25 | 1.25 |
| 9 | 4.5 | 5.2 | 15.0 | | | | | | | 0.25 | | | 6.23 | 0.25 | 1.25 |
| 10 | 4.5 | 5.2 | 15.0 | | | | | | | | 0.25 | | 6.23 | 0.25 | 1.25 |
| 11 | 4.5 | 5.2 | 15.0 | | | | | | | | | | 6.23 | 0.25 | 1.25 |

TABLE 1

| | Charged amounts (g) | | | | |
|---|---|---|---|---|---|
| | Media | | Molecular weight modifier | Polymerization initiator VA061 | Solid content |
| Ex. | DPM | Water | DoSH | A | (mass %) |
| 1 | 15.0 | 29.7 | 0.25 | 2.49 | 32.1 |
| 2 | 15.0 | 29.7 | 0.25 | 2.49 | 32.6 |
| 3 | 15.0 | 29.7 | 0.25 | 2.49 | 30.9 |
| 4 | 15.0 | 29.7 | 0.25 | 2.49 | 29.2 |
| 5 | 15.0 | 29.7 | 0.25 | 2.49 | 30.4 |
| 6 | 15.0 | 29.7 | 0.25 | 2.49 | 32.9 |
| 7 | 15.0 | 29.7 | 0.25 | 2.49 | 28.6 |
| 8 | 15.0 | 29.7 | 0.25 | 2.49 | 28.6 |
| 9 | 15.0 | 29.7 | 0.25 | 2.49 | 29.0 |
| 10 | 15.0 | 29.7 | 0.25 | 2.49 | 28.0 |
| 11 | 15.0 | 29.7 | 0.25 | 2.49 | 33.0 |

TABLE 3

| | Proportions (mass %) of structural units based on monomers and other PFPE | | | | | | | | | | | | |
|---|---|---|---|---|---|---|---|---|---|---|---|---|---|
| | (a) | (d) | (b) | (e) | | | (c) | | | | | Other PFPE | |
| Ex. | C6FMA | VCl | BeA | STA | HEMA | N-MAM | PFPE-A | PFPE-B | PFPE-C | PFPE-D | PFPE-E | PFPE-1 | PFPE-2 |
| 1 | 18 | 21.5 | 60 | | | | 0.5 | | | | | | |
| 2 | 18 | 21 | 60 | | | | 1 | | | | | | |
| 3 | 18 | 21 | 60 | | | | | 1 | | | | | |
| 4 | 18 | 21 | 60 | | | | | | 1 | | | | |
| 5 | 18 | 21 | 60 | | | | | | | | | 1 | |
| 6 | 18 | 21 | 60 | | | | | | | | | | 1 |
| 7 | 14.8 | 21 | 60 | | 0.5 | 3.7 | | | | | | | |
| 8 | 18 | 21.5 | | 60 | | | 0.5 | | | | | | |
| 9 | 18 | 21 | 60 | | | | | | | | 1 | | |
| 10 | 18 | 21 | 60 | | | | | | | 1 | | | |
| 11 | 18 | 22 | 60 | | | | | | | | | | |

TABLE 4

| | Nylon taffeta | | | | | | | |
|---|---|---|---|---|---|---|---|---|
| | Oil repellency | Water repellency | | | | Heavy rain durability | | |
| | Number of washing times | Number of washing times | Friction After 1,000 | Number of washing times | Number of washing times | Number of washing times | Number of washing times | |
| Ex. | 0 | 0 | times | 10 | 20 | 0 | 5 | Texture |
| 1 | 3 | 5 | 4+ | 4− | 3+ | 4+ | 4− | Δ |
| 2 | 4 | 5 | 4 | 3 | 3+ | 4+ | 4− | ○ |
| 3 | 3 | 5 | 4+ | 4 | 3+ | 4+ | 4− | ○ |
| 4 | 3 | 5 | 4+ | 4 | 3+ | 4+ | 4− | ○ |

TABLE 4-continued

| | Nylon taffeta | | | | | | | |
|---|---|---|---|---|---|---|---|---|
| | Oil repellency | Water repellency | | | | Heavy rain durability | | |
| Ex. | Number of washing times 0 | Number of washing times 0 | Friction After 1,000 times | Number of washing times 10 | Number of washing times 20 | Number of washing times 0 | Number of washing times 5 | Texture |
| 5 | 1+ | 5 | 5 | 5− | 3 | 5− | 3− | Δ |
| 6 | 1 | 5 | 5 | 5− | 3 | 5− | 2+ | x |
| 7 | 1 | 5 | 4 | 5− | 3+ | 4+ | 4− | x |
| 8 | 3 | 5 | 5− | 3 | 3 | 4 | 1 | ○ |
| 9 | 3 | 5 | 5− | 4 | 3 | 5− | 3 | ○ |
| 10 | 3 | 5− | 5− | 3 | 3 | 4+ | 4− | ○ |
| 11 | 2− | 5 | 4+ | 5− | 3 | 5− | 4− | x |

INDUSTRIAL APPLICABILITY

The water/oil repellent composition of the present invention is useful as a water/oil repellent for imparting water/oil repellency to fiber products (clothing articles (sportswears, coats, jackets, work clothing, uniforms, etc.), bags, industrial materials, etc.), non-woven fabrics, leather products, wood, stone, concrete-type building materials, etc. Further, it is useful also as a coating agent for a filtration material to be used in the presence of an organic solvent liquid or its vapor, as a surface protective agent, as a coating agent for electronics, or as an antifouling coating. Still further, it is useful in applications to impart water/oil repellency by mixing it with polypropylene, nylon, etc., followed by molding and fiberizing.

This application is a continuation of PCT Application No. PCT/JP2015/085264, filed on Dec. 16, 2015, which is based upon and claims the benefit of priority from Japanese Patent Application No. 2014-254937 filed on Dec. 17, 2014. The contents of those applications are incorporated herein by reference in their entireties.

What is claimed is:

1. A water/oil repellent composition comprising a copolymer containing structural units based on the following monomer (a), structural units based on the following monomer (b) and structural units based on the following monomer (c), and a liquid medium:

Monomer (a): a compound represented by the following formula (1).

$$(Z-Y)_n X \quad (1)$$

wherein Z is a $C_{1-6}$ perfluoroalkyl group or a group represented by the following formula (2), Y is a divalent organic group having no fluorine atom, or a single bond, n is 1 or 2, and X is, when n is 1, any one of groups represented by the following formulae (3-1) to (3-5), or, when n is 2, any one of groups represented by the following formulae (4-1) to (4-4):

$$C_s F_{2s+1} CH_2 CF_2 —(CH_2 CF_2)_t (CF_2 CF_2)_u— \quad (2)$$

wherein s is an integer of from 1 to 6, t is an integer of from 0 to 3, and u is an integer of from 1 to 3, $$—CR=CH_2 \quad (3\text{-}1),$$

$$—C(O)OCR=CH_2 \quad (3\text{-}2),$$

$$—OC(O)CR=CH_2 \quad (3\text{-}3),$$

$$—OCH_2\text{-}\varphi\text{-}CR=CH_2 \quad (3\text{-}4),$$

$$—OCH=CH_2 \quad (3\text{-}5),$$

wherein R is a hydrogen atom, a methyl group or a halogen atom, and $\varphi$ is a phenylene group, $$—CH[—(CH_2)_m CR=CH_2]— \quad (4\text{-}1),$$

$$—CH[—(CH_2)_m C(O)OCR=CH_2]— \quad (4\text{-}2),$$

$$—CH[—(CH_2)_m OC(O)CR=CH_2]— \quad (4\text{-}3),$$

$$—OC(O)CH=CHC(O)O— \quad (4\text{-}4),$$

wherein R is a hydrogen atom, a methyl group or a halogen atom, and m is an integer of from 0 to 4, Monomer (b): a(meth)acrylate having no polyfluoroalkyl group and having an alkyl group with at least 12 carbon atoms, Monomer (c): a monomer having a poly(oxypolyfluoroalkylene) chain wherein the proportion of the number of fluorine atoms to the total number of fluorine atoms and hydrogen atoms is at least 70%, wherein the proportion of structural units based on the monomer (a) in the copolymer is from 5 to 40 mass % among the structural units (100 mass %) based on all monomers constituting the copolymer, the proportion of structural units based on the monomer (b) in the copolymer is from 40 to 94.9 mass % among the structural units (100 mass %) based on all monomers constituting the copolymer, and the proportion of structural units based on the monomer (c) in the copolymer is from 0.1 to 20 mass % among the structural units (100 mass %) based on all monomers constituting the copolymer.

2. The water/oil repellent composition according to claim 1, wherein the copolymer further contains structural units based on following monomer (d):

Monomer (d): a halogenated olefin.

3. The water/oil repellent composition according to claim 2, wherein the proportion of structural units based on the monomer (d) in the copolymer is at most 30 mass % among the structural units (100 mass %) based on all monomers constituting the copolymer.

4. The water/oil repellent composition according to claim 1, wherein the copolymer further contains structural units based on following monomer (e):

Monomer (e): a monomer having a crosslinkable functional group.

5. The water/oil repellent composition according to claim 4, wherein the proportion of structural units based on the monomer (e) in the copolymer is at most 20 mass % among the structural units (100 mass %) based on all monomers constituting the copolymer.

6. The water/oil repellent composition according to claim 1, wherein the copolymer further contains structural units based on following monomer (f):

Monomer (f): a monomer containing no fluorine atom, other than the above monomer (b), halogenated olefin and monomer having a crosslinkable functional group.

7. The water/oil repellent composition according to claim 6, wherein the proportion of structural units based on the monomer (f) in the copolymer is at most 35 mass % among the structural units (100 mass %) based on all monomers constituting the copolymer.

8. The water/oil repellent composition according to claim 1, wherein the water/oil repellent composition further contains a surfactant, the liquid medium is an aqueous liquid medium, and the copolymer is emulsified in the aqueous liquid medium.

9. An article treated by using the water/oil repellent composition as defined in claim 1.

10. The article according to claim 9, wherein the article is a fiber product.

11. A method for producing a water/oil repellent composition, which comprises polymerizing monomer components comprising the following monomer (a), the following monomer (b) and the following monomer (c) in a liquid medium in the presence of a surfactant and a polymerization initiator, to form a copolymer:

Monomer (a): a compound represented by the following formula (1):

$$(Z-Y)_n X \quad (1)$$

wherein Z is a $C_{1-6}$ perfluoroalkyl group or a group represented by the following formula (2), Y is a divalent organic group having no fluorine atom, or a single bond, n is 1 or 2, and X is, when n is 1, any one of groups represented by the following formulae (3-1) to (3-5), or, when n is 2, any one of groups represented by the following formulae (4-1) to (4-4):

$$C_s F_{2s+1} CH_2 CF_2-(CH_2CF_2)_t(CF_2CF_2)_u- \quad (2)$$

wherein s is an integer of from 1 to 6, t is an integer of from 0 to 3, and u is an integer of from 1 to 3, $$-CR=CH_2 \quad (3-1)$$

$$-C(O)OCR=CH_2 \quad (3-2),$$

$$-OC(O)CR=CH_2 \quad (3-3),$$

$$-OCH_2\text{-}\varphi\text{-}CR=CH_2 \quad (3-4),$$

$$-OCH=CH_2 \quad (3-5),$$

wherein R is a hydrogen atom, a methyl group or a halogen atom, and φ is a phenylene group, $$-CH[-(CH_2)_m CR=CH_2]- \quad (4-1),$$

$$-CH[-(CH_2)_m C(O)OCR=CH_2]- \quad (4-2),$$

$$-CH[-(CH_2)_m OC(O)CR=CH_2]- \quad (4-3),$$

$$-OC(O)CH=CHC(O)O- \quad (4-4),$$

wherein R is a hydrogen atom, a methyl group or a halogen atom, and m is an integer of from 0 to 4, Monomer (b): a (meth)acrylate having no polyfluoroalkyl group and having an alkyl group with at least 12 carbon atoms, Monomer (c): a monomer having a poly(oxypolyfluoroalkylene) chain wherein the proportion of the number of fluorine atoms to the total number of fluorine atoms and hydrogen atoms is at least 70%, wherein the proportion of the monomer (a) in the monomer components is from 5 to 40 mass % among the monomer components (100 mass %), the proportion of the monomer (b) in the monomer components is from 40 to 94.9 mass % among the monomer components (100 mass %), and the proportion of the monomer (c) in the monomer components is from 0.1 to 20 mass % among the monomer components (100 mass %).

12. The method for producing a water/oil repellent composition according to claim 11, wherein the monomer components further contain the following monomer (d):

Monomer (d): a halogenated olefin.

13. The method for producing a water/oil repellent composition according to claim 11, wherein the monomer components further contain the following monomer (e):

Monomer(e): a monomer having a crosslinkable functional group.

* * * * *